United States Patent
Yoeli

(10) Patent No.: US 8,496,200 B2
(45) Date of Patent: Jul. 30, 2013

(54) CONTROL FLOWS AND FORCES IN VTOL VEHICLES

(75) Inventor: Raphael Yoeli, Tel-Aviv (IL)

(73) Assignee: Urban Aeronautics Ltd., Yavne (IL)

( * ) Notice: Subject to any disclaimer, the term of this patent is extended or adjusted under 35 U.S.C. 154(b) by 689 days.

(21) Appl. No.: 12/598,514

(22) PCT Filed: Apr. 30, 2008

(86) PCT No.: PCT/IL2008/000575
§ 371 (c)(1),
(2), (4) Date: Apr. 23, 2010

(87) PCT Pub. No.: WO2008/135973
PCT Pub. Date: Nov. 13, 2008

(65) Prior Publication Data
US 2011/0049306 A1 Mar. 3, 2011

Related U.S. Application Data

(60) Provisional application No. 60/924,168, filed on May 2, 2007.

(51) Int. Cl.
*B64C 29/00* (2006.01)
(52) U.S. Cl.
USPC ...................... 244/23 B; 244/17.25
(58) Field of Classification Search
USPC .................. 244/12.1, 12.3, 12.5, 23 R, 23 A, 244/23 B, 23 C, 23 D, 17.23, 17.25
See application file for complete search history.

(56) References Cited

U.S. PATENT DOCUMENTS

| | | | |
|---|---|---|---|
| 1,287,076 | A | 12/1918 | Moses |
| 2,077,471 | A | 4/1937 | Fink |
| 2,138,999 | A | 12/1938 | Clark |
| 2,242,201 | A | 5/1941 | Woods |
| 2,273,724 | A | 2/1942 | Nelson et al. |
| D155,004 | S | 8/1949 | Gluhareff |
| 2,709,947 | A | 6/1955 | Woods |

(Continued)

FOREIGN PATENT DOCUMENTS

| | | |
|---|---|---|
| EP | 0 236583 | 9/1987 |
| EP | 0 553490 | 8/1993 |

(Continued)

OTHER PUBLICATIONS

Written Opinion and International Search Report of the International Searching Authority in International Application No. PCT/IB09/053768 (Yoeli) (now WO 2010-026517 A2) dated Mar. 3, 2010.

(Continued)

*Primary Examiner* — Timothy D Collins
*Assistant Examiner* — Brian M O'Hara
(74) *Attorney, Agent, or Firm* — Nixon & Vanderhye, P.C.

(57) ABSTRACT

The present application relates to VTOL vehicles with multi-function capabilities and, specifically to ducted fan arrangements that facilitate the control of forces and flows of air to control movement of the vehicle in six degrees of freedom in both primary and secondary modes of operation. Also disclosed are pitch control mechanisms for the lift propellers of VTOL vehicles: drive and transmission arrangements; a specially configured exhaust duct for directing exhaust gases from such vehicles along an upper surface of the vehicle; and shock absorbing components for the landing gear of such vehicles.

9 Claims, 20 Drawing Sheets

U.S. PATENT DOCUMENTS

| | | |
|---|---|---|
| 2,734,699 A | 2/1956 | Lippisch |
| 2,734,705 A | 2/1956 | Robertson |
| 2,777,649 A | 1/1957 | Williams |
| 2,812,636 A | 11/1957 | Kadosch et al. |
| 2,899,149 A | 8/1959 | Breguet |
| 2,930,544 A | 3/1960 | Howell |
| 2,936,969 A | 5/1960 | Griffith et al. |
| 2,939,649 A | 6/1960 | Shaw |
| 2,951,661 A | 9/1960 | Dorman et al. |
| 2,955,780 A * | 10/1960 | Hulbert ............... 244/23 R |
| 2,968,453 A | 1/1961 | Bright |
| 2,973,921 A | 3/1961 | Price |
| 2,975,676 A | 3/1961 | Butler |
| 2,988,301 A | 6/1961 | Fletcher |
| 3,033,493 A | 5/1962 | Wilde et al. |
| 3,039,537 A | 6/1962 | Heidelberg |
| 3,058,693 A | 10/1962 | Doak |
| 3,082,977 A | 3/1963 | Arlin |
| 3,088,695 A | 5/1963 | Clark |
| 3,090,581 A | 5/1963 | Einarsson |
| 3,116,898 A | 1/1964 | Clark et al. |
| 3,136,500 A | 6/1964 | Kerry |
| 3,139,244 A | 6/1964 | Bright |
| 3,161,374 A | 12/1964 | Allred et al. |
| 3,167,273 A | 1/1965 | Calderon |
| 3,174,573 A | 3/1965 | Chaplin |
| 3,179,353 A | 4/1965 | Peterson |
| 3,179,354 A | 4/1965 | Alvarez-Calderon |
| 3,181,810 A | 5/1965 | Olson |
| 3,184,183 A | 5/1965 | Piasecki |
| 3,187,817 A | 6/1965 | Colley |
| 3,198,082 A | 8/1965 | Kerris |
| 3,201,067 A | 8/1965 | Meyerhoff |
| 3,203,645 A | 8/1965 | Shaw |
| 3,223,354 A | 12/1965 | Seibold et al. |
| 3,224,712 A | 12/1965 | Taylor et al. |
| 3,231,221 A | 1/1966 | Platt |
| 3,244,246 A | 4/1966 | Weiland |
| 3,259,343 A | 7/1966 | Roppel |
| 3,262,511 A | 7/1966 | Carr |
| 3,262,657 A | 7/1966 | Anker-Holth |
| 3,265,329 A | 8/1966 | Postelson-Apostolescu |
| 3,276,528 A | 10/1966 | Tucknott et al. |
| 3,289,977 A | 12/1966 | Staats |
| 3,350,035 A | 10/1967 | Schlieben |
| 3,360,217 A | 12/1967 | Trotter |
| 3,383,074 A | 5/1968 | Coplin |
| 3,384,327 A | 5/1968 | Postelson-Apostolescu |
| 3,397,852 A | 8/1968 | Katzen |
| 3,397,854 A | 8/1968 | Reyle |
| 3,454,238 A | 7/1969 | Goodson |
| 3,463,420 A | 8/1969 | Butler et al. |
| 3,481,559 A * | 12/1969 | Apostolescu ............... 244/2 |
| 3,519,224 A | 7/1970 | Boyd et al. |
| 3,559,921 A | 2/1971 | Timperman |
| 3,580,530 A | 5/1971 | Wada |
| 3,584,810 A | 6/1971 | Velton |
| 3,606,208 A | 9/1971 | Postelson-Apostolescu |
| 3,614,030 A | 10/1971 | Moller |
| 3,627,235 A | 12/1971 | Lippisch |
| 3,633,849 A | 1/1972 | Kling |
| 3,665,809 A | 5/1972 | Darlington et al. |
| 3,713,748 A | 1/1973 | Langley |
| 3,752,417 A | 8/1973 | Lagace |
| 3,827,527 A | 8/1974 | Bertelsen |
| 3,873,049 A | 3/1975 | Horsdal |
| 3,904,155 A | 9/1975 | Chavis |
| 3,912,201 A | 10/1975 | Bradbury |
| 3,955,780 A * | 5/1976 | Postelson ............... 244/12.3 |
| 3,972,490 A | 8/1976 | Zimmermann et al. |
| 4,022,405 A | 5/1977 | Peterson |
| 4,043,421 A | 8/1977 | Smith |
| 4,071,207 A | 1/1978 | Piasecki et al. |
| 4,149,688 A | 4/1979 | Miller, Jr. |
| 4,171,784 A | 10/1979 | Eickmann |
| 4,194,707 A | 3/1980 | Sharpe |
| 4,469,294 A | 9/1984 | Clifton |
| 4,505,442 A | 3/1985 | Kirsch et al. |
| 4,505,443 A | 3/1985 | Bradfield et al. |
| 4,537,372 A | 8/1985 | Forizs |
| 4,598,890 A | 7/1986 | Herzog et al. |
| 4,701,602 A | 10/1987 | Schaefer et al. |
| 4,754,940 A | 7/1988 | Deter |
| 4,757,962 A | 7/1988 | Grant |
| 4,765,568 A | 8/1988 | Carl et al. |
| 4,795,111 A | 1/1989 | Moller |
| 4,796,836 A | 1/1989 | Buchelt |
| 4,824,048 A | 4/1989 | Kim |
| 4,828,203 A | 5/1989 | Clifton et al. |
| 4,834,319 A | 5/1989 | Ewy et al. |
| 4,856,732 A | 8/1989 | Eickmann |
| 4,880,071 A | 11/1989 | Tracy |
| 4,892,274 A | 1/1990 | Pohl et al. |
| 4,917,332 A | 4/1990 | Patterson, Jr. |
| 4,934,629 A | 6/1990 | Brant |
| 4,982,914 A | 1/1991 | Eickmann |
| 5,064,143 A | 11/1991 | Bucher |
| 5,101,927 A | 4/1992 | Murtuza |
| 5,141,173 A | 8/1992 | Lay |
| 5,209,428 A | 5/1993 | Bevilaqua et al. |
| 5,297,761 A | 3/1994 | Kendall, Jr. et al. |
| 5,303,879 A | 4/1994 | Bucher |
| 5,395,073 A | 3/1995 | Rutan et al. |
| 5,407,150 A | 4/1995 | Sadleir |
| 5,419,514 A | 5/1995 | Ducan |
| 5,454,531 A | 10/1995 | Melkuti |
| 5,505,407 A | 4/1996 | Chiappetta |
| 5,666,483 A | 9/1997 | McClary |
| 5,738,302 A | 4/1998 | Freeland |
| 5,746,390 A | 5/1998 | Chiappetta et al. |
| 5,806,805 A | 9/1998 | Elbert et al. |
| 5,890,441 A | 4/1999 | Swinson et al. |
| 6,050,520 A | 4/2000 | Kirla |
| 6,089,501 A | 7/2000 | Frost |
| 6,105,901 A | 8/2000 | Ulanoski et al. |
| 6,119,985 A | 9/2000 | Clapp et al. |
| 6,170,778 B1 | 1/2001 | Cycon et al. |
| 6,254,032 B1 | 7/2001 | Bucher |
| 6,270,038 B1 | 8/2001 | Cycon et al. |
| 6,318,668 B1 | 11/2001 | Ulanoski et al. |
| 6,371,406 B1 | 4/2002 | Corcoran |
| 6,382,559 B1 | 5/2002 | Sutterfield et al. |
| 6,402,088 B1 | 6/2002 | Syrovy et al. |
| 6,431,494 B1 | 8/2002 | Kinkead et al. |
| 6,446,911 B1 | 9/2002 | Yount et al. |
| 6,457,670 B1 | 10/2002 | Geranio |
| 6,464,166 B1 | 10/2002 | Yoeli |
| 6,474,598 B2 | 11/2002 | Carter, Jr. |
| 6,520,449 B2 | 2/2003 | Illingworth |
| 6,561,456 B1 | 5/2003 | Devine |
| 6,568,630 B2 | 5/2003 | Yoeli |
| 6,616,094 B2 | 9/2003 | Illingworth |
| 6,644,598 B2 | 11/2003 | Glezer et al. |
| 6,648,270 B1 | 11/2003 | Burnett et al. |
| 6,704,624 B2 | 3/2004 | Ortega et al. |
| 6,708,920 B2 | 3/2004 | Fukuyama |
| 6,745,977 B1 | 6/2004 | Long et al. |
| 6,751,530 B2 | 6/2004 | Seifert et al. |
| D496,606 S | 9/2004 | Sanders, Jr. |
| 6,808,140 B2 | 10/2004 | Moller |
| 6,817,570 B2 | 11/2004 | Yoeli |
| 6,824,095 B2 | 11/2004 | Mao |
| 6,834,832 B2 | 12/2004 | Jamgarov |
| 6,843,447 B2 | 1/2005 | Morgan |
| 6,883,748 B2 | 4/2005 | Yoeli |
| 6,886,776 B2 | 5/2005 | Wagner et al. |
| 6,892,979 B2 | 5/2005 | Milde |
| 6,892,980 B2 | 5/2005 | Kawai |
| 6,913,226 B2 | 7/2005 | Huynh |
| 6,926,322 B2 | 8/2005 | Browne et al. |
| 6,969,027 B2 * | 11/2005 | Ishiba ............... 244/23 C |
| 6,974,105 B2 | 12/2005 | Pham |
| 7,246,769 B2 | 7/2007 | Yoeli |
| 7,249,732 B2 | 7/2007 | Sanders, Jr. et al. |
| 7,267,300 B2 | 9/2007 | Heath et al. |
| 7,275,712 B2 | 10/2007 | Yoeli |
| 7,364,115 B2 | 4/2008 | Parks et al. |

| | | |
|---|---|---|
| 7,717,368 B2 | 5/2010 | Yoeli |
| 7,789,342 B2 | 9/2010 | Yoeli |
| 7,806,362 B2 | 10/2010 | Yoeli |
| 7,857,253 B2 | 12/2010 | Yoeli |
| 7,918,416 B2 | 4/2011 | Yoeli |
| 7,946,528 B2 | 5/2011 | Yoeli |
| 8,020,804 B2 | 9/2011 | Yoeli |
| 8,066,220 B2 | 11/2011 | Kirstein |
| 8,342,441 B2 | 1/2013 | Yoeli |
| 2002/0060267 A1 | 5/2002 | Yavnai |
| 2002/0161488 A1 | 10/2002 | Guillemin et al. |
| 2003/0038213 A1 | 2/2003 | Yoeli |
| 2003/0062442 A1 | 4/2003 | Milde, Jr. |
| 2003/0062443 A1 | 4/2003 | Wagner et al. |
| 2003/0080242 A1 | 5/2003 | Kawai |
| 2003/0085319 A1 | 5/2003 | Wagner et al. |
| 2003/0127559 A1 | 7/2003 | Walmsley |
| 2003/0195673 A1 | 10/2003 | Foch et al. |
| 2004/0026563 A1 | 2/2004 | Moller |
| 2004/0104303 A1 | 6/2004 | Mao |
| 2004/0149857 A1 | 8/2004 | Yoeli |
| 2004/0155143 A1 | 8/2004 | Yoeli |
| 2005/0029407 A1 | 2/2005 | Pohl et al. |
| 2005/0040283 A1 | 2/2005 | Frazer |
| 2005/0065669 A1 | 3/2005 | Roux et al. |
| 2005/0109875 A1 | 5/2005 | Ouellette et al. |
| 2005/0178881 A1 | 8/2005 | Yoeli |
| 2005/0242231 A1 | 11/2005 | Yoeli |
| 2006/0097107 A1 | 5/2006 | Parks et al. |
| 2006/0113426 A1 | 6/2006 | Yoeli |
| 2006/0226281 A1 | 10/2006 | Walton |
| 2006/0231675 A1 | 10/2006 | Bostan |
| 2007/0018034 A1 | 1/2007 | Dickau |
| 2007/0034734 A1 | 2/2007 | Yoeli |
| 2007/0034738 A1 | 2/2007 | Sanders, Jr. et al. |
| 2007/0034739 A1 | 2/2007 | Yoeli |
| 2007/0095971 A1 | 5/2007 | Yoeli |
| 2007/0158494 A1 | 7/2007 | Burrage |
| 2008/0054121 A1 | 3/2008 | Yoeli |
| 2008/0142643 A1 | 6/2008 | Yoeli |
| 2008/0283673 A1 | 11/2008 | Yoeli |
| 2009/0084907 A1 | 4/2009 | Yoeli |
| 2009/0140102 A1 | 6/2009 | Yoeli |
| 2009/0159757 A1 | 6/2009 | Yoeli |
| 2010/0051740 A1 | 3/2010 | Yoeli |
| 2010/0051753 A1 | 3/2010 | Yoeli |
| 2010/0076625 A1 | 3/2010 | Yoeli |
| 2010/0270419 A1 | 10/2010 | Yoeli |
| 2011/0042509 A1 | 2/2011 | Bevirt et al. |
| 2011/0042510 A1 | 2/2011 | Bevirt et al. |
| 2011/0049307 A1 | 3/2011 | Yoeli |
| 2011/0168834 A1 | 7/2011 | Yoeli |
| 2011/0174920 A1 | 7/2011 | Yoeli |
| 2012/0080564 A1 | 4/2012 | Yoeli |

FOREIGN PATENT DOCUMENTS

| | | |
|---|---|---|
| EP | 0 922925 | 6/1999 |
| GB | 935884 | 9/1963 |
| GB | 951186 | 3/1964 |
| IT | 666076 A | 8/1964 |
| SE | 184314 | 6/1963 |
| WO | 01/93039 A1 | 12/2001 |
| WO | 02/096750 A2 | 12/2002 |
| WO | 02/098732 A2 | 12/2002 |
| WO | 03/016134 A1 | 2/2003 |
| WO | 2004/012993 A1 | 2/2004 |
| WO | 2004/031876 A1 | 4/2004 |
| WO | 2004/065208 A2 | 8/2004 |
| WO | 2005/039972 A2 | 5/2005 |
| WO | 2006/072960 A2 | 7/2006 |
| WO | 2006/131920 | 12/2006 |
| WO | 2007/052271 A2 | 5/2007 |
| WO | 2007/099543 A2 | 9/2007 |
| WO | 2007/129313 A2 | 11/2007 |
| WO | 2008/065654 A2 | 6/2008 |
| WO | 2008/065664 A2 | 6/2008 |
| WO | 2008/135973 A2 | 11/2008 |
| WO | 2009/077968 A2 | 6/2009 |
| WO | 2009/147630 A1 | 12/2009 |
| WO | 2010/026517 A2 | 3/2010 |
| WO | 2010/067325 A2 | 6/2010 |

OTHER PUBLICATIONS

Edward D. Flinn, "Revolutionary X-Hawk Hovers Near Success," Aerospace America, Jul. 2003, pp. 26-28.

Raymond L. Robb, "Driving on Air: 20$^{th}$ Century Flying Carpets," Vertiflite, vol. 51, No. 1, Spring 2005, pp. 2-11.

Urban Aeronautics Ltd., "The X-Hawk VTOL Utility Vehicle"—product description and specifications, 2004.

Piasecki Aircraft Corporation Product Description and History for Piasecki VZ-8 VTOL research vehicle (undated).

De Lorean DMC-12, alleged to have first been produced in 1981 (images available from Wikipedia, the free encyclopedia, at http://en.wikipedia.org/wiki/De_Lorean_DMC-12 ).

International Search Report for International Application No. PCT/IL02/00417 (now WO 02/096750), dated May 23, 2003, published Oct. 2, 2003.

Written Opinion in International Application No. PCT/IL02/00417 (now WO 02/096750), Aug. 19, 2003.

International Preliminary Examination Report for International Application No. PCT/IL02/00417 (now WO 02/096750), Oct. 20, 2003.

Corrected International Preliminary Examination Report for International Application No. PCT/IL02/00417 (now WO 02/096750), Jul. 25, 2004.

International Search Report for International Application No. PCT/IL02/000439 (now WO 2002/098732), dated Apr. 28, 2003, published Mar. 18, 2004.

International Preliminary Examination Report in International Application No. PCT/IL02/000439 (now WO 2002/098732), Jul. 26, 2004.

International Search Report for International Application No. PCT/IL02/00682 (now WO 03/016134 (Yoeli)), dated Dec. 6, 2002.

International Search Report for International Application No. PCT/IL03/00640 (now WO 2004/012993 (Yoeli)), dated Jan. 2, 2004.

International Search Report for International Application No. PCT/IL03/00786 (now WO 2004/031876), Feb. 9, 2004.

International Search Report for International Application No. PCT/IL04/00984 (now WO 2005/039972 (Yoeli)), dated Dec. 6, 2005, published Jan. 26, 2006.

Written Opinion of the International Searching Authority in International Application No. PCT/IL04/00984 (now WO 2005/039972 (Yoeli)), dated Dec. 6, 2005.

International Preliminary Report on Patentability in International Application No. PCT/IL04/00984 (now WO 2005/039972 (Yoeli)), dated May 1, 2006.

Written Opinion/Search Report of the International Searching Authority in International Application No. PCT/IL06/00032 (now WO 2006/072960 (Yoeli)), dated Sep. 11, 2006.

International Preliminary Report on Patentability in International Application No. PCT/IL06/00032 (now WO 2006/072960 (Yoeli)), dated Sep. 11, 2006.

International Search Report for International Application No. PCT/IL06/00663 (now WO 2006/131920) (Yoeli) dated Dec. 19, 2006.

Written Opinion of the International Searching Authority in International Application No. PCT/IL06/00663 (now WO 2006/131920) (Yoeli) dated Dec. 19, 2006.

International Search Report for International Application No. PCT/IL06/01264 (now WO 2007/052271 A2) (Yoeli) dated Aug. 5, 2008.

Written Opinion of the International Searching Authority in International Application No. PCT/IL06/01264 (now WO 2007/052271 A2) (Yoeli) dated Aug. 5, 2008.

Written Opinion and Search Report of the International Searching Authority in International Application No. PCT/IL07/00271 (now WO 2007/099543 A2) (Yoeli) dated Oct. 28, 2008.

International Search Report for International Application No. PCT/IL07/00544 (now WO 2007/129313) (Yoeli) dated Jul. 7, 2008.

Written Opinion of the International Searching Authority in International Application No. PCT/IL07/00544 (now WO 2007/129313) (Yoeli) dated Jul. 7, 2008.

International Search Report for International Application No. PCT/IL0701465 (now WO 2008/065654) (Yoeli) dated Sep. 30, 2008.
Written Opinion of the International Searching Authority in International Application No. PCT/IL0701465 (now WO 2008/065654) (Yoeli) dated Sep. 30, 2008.
Written Opinion and Search Report of the International Searching Authority in International Application No. PCT/IL07/01475 (now WO 2008/065664 A2) (Yoeli) dated Sep. 2, 2008.
Corrected Written Opinion and Search Report of the International Searching Authority in International Application No. PCT/IL07/01475 (now WO 2008/065664 A2) (Yoeli) dated Jul. 27, 2009.
Written Opinion and International Search Report of the International Searching Authority in International Application No. PCT/IB08/055301 (now WO 2009/077968) (Yoeli) dated Aug. 14, 2009.
Written Opinion and International Search Report of the International Searching Authority in International Application No. PCT/IB09/052346 (Yoeli) (now WO2009-147630 A1) dated Oct. 20, 2009.
U.S. Appl. No. 10/523,609 (Yoeli), filed Feb. 7, 2005.
U.S. Appl. No. 10/987,321 (Yoeli), filed Nov. 15, 2004.
U.S. Appl. No. 11/061,652 (Yoeli), filed Feb. 22, 2005.
U.S. Appl. No. 11/411,243 (Yoeli), filed Apr. 26, 2006.
U.S. Appl. No. 11/447,311 (Yoeli), filed Jun. 6, 2006.
U.S. Appl. No. 11/405,003 (Yoeli), filed Apr. 17, 2006.
U.S. Appl. No. 11/794,906 (Yoeli), filed Jul. 9, 2007.
U.S. Appl. No. 11/798,187 (Yoeli), filed May 10, 2007.
U.S. Appl. No. 11/826,202 (Yoeli), filed Jul. 12, 2007.
U.S. Appl. No. 11/892,414 (Yoeli), filed Aug. 22, 2007.
U.S. Appl. No. 12/224,549 (Yoeli), filed Nov. 4, 2008.
U.S. Appl. No. 12/226,952 (Yoeli), filed Feb. 27, 2009.
U.S. Appl. No. 12/516,257 (Yoeli), filed May 26, 2009.
U.S. Appl. No. 12/516,743 (Yoeli), filed May 28, 2009.
U.S. Appl. No. 12/549,872 (Yoeli), filed Aug. 28, 2009.
Written Opinion and International Search Report of the International Searching Authority in International Application No. PCT/IB09/55656 (now WO 2010-067325 A2) mailed Sep. 30, 2010.
U.S. Appl. No. 12/938,444 (Yoeli), filed Nov. 3, 2010.
U.S. Appl. No. 12/989,533 (Yoeli), filed Oct. 25, 2010.
U.S. Appl. No. 13/252,278 (Yoeli), filed Oct. 4, 2011.
U.S. Appl. No. 12/747,830 (Yoeli), filed Jun. 11, 2010.
International Search Report for PCT/IL2008/000575, mailed Oct. 23, 2008.
Written Opinion of the International Searching Authority for PCT/IL2008/000575, mailed Oct. 28, 2008.
U.S. Appl. No. 13/071,858 (Yoeli), filed Mar. 25, 2011.

* cited by examiner

Primary

Secondary

Primary

Secondary

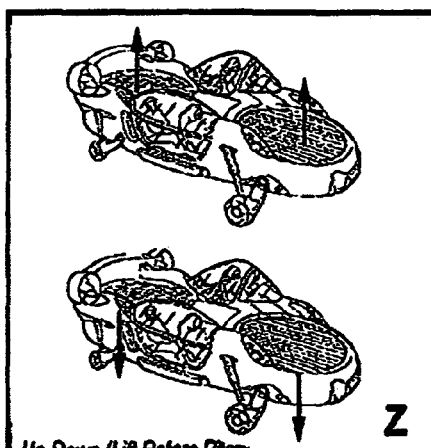
Fig. 19A
Primary
Fig. 19B
Option a: Fig. 24 (both ducts)
Option b: Fig. 26 (both ducts)
Option c: Rotor RPM through engine governor
Secondary
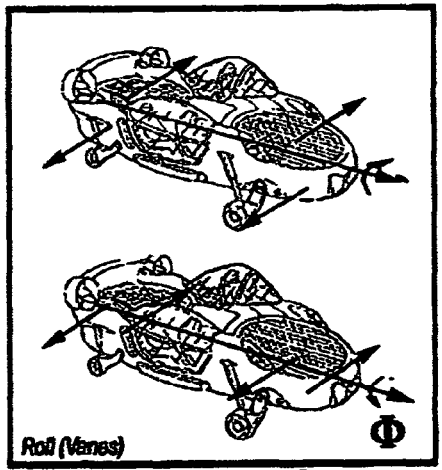
Fig. 20A
Primary
Fig. 20B
Option a: Fig. 23 (both ducts)
Option b: Fig. 27 (both ducts)
Secondary

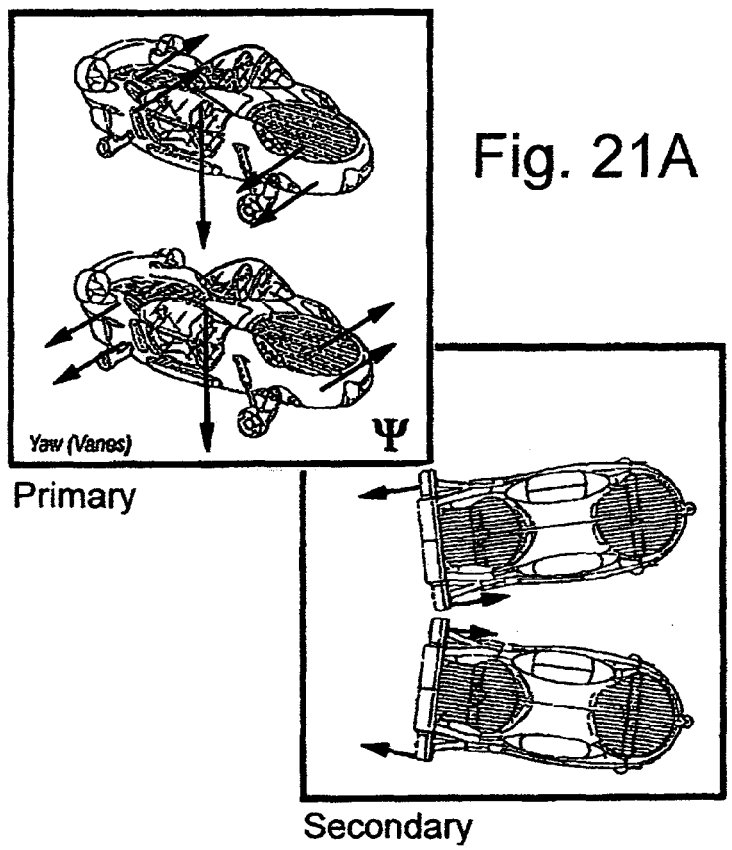
Fig. 21A
Fig. 21B
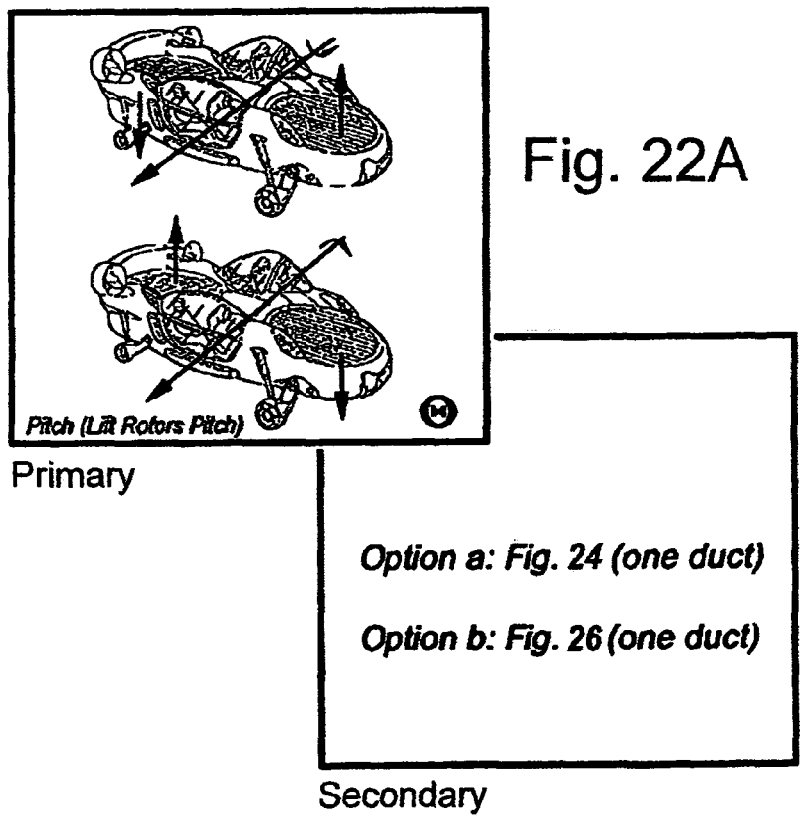
Fig. 22A
Fig. 22B
Option a: Fig. 24 (one duct)
Option b: Fig. 26 (one duct)

$$\ddot{\theta}(t) = M1(t)/Iyy = (X1 + 0.5H1)P1(t)/Iyy$$
$$V2(t) = V1 - g/W \times \int P1(t) + X2 \times \int \ddot{\theta}(t)$$

$$\ddot{\theta}(t) = M1(t)/Ixx = (X1 + 0.5H1)P1(t)/Ixx$$
$$V2(t) = V1 - g/W \times \int P1(t) + X2 \times \int \ddot{\theta}(t)$$

CONTROL FLOWS AND FORCES IN VTOL VEHICLES

This application is the U.S. national phase of international Application No. PCT/IL2008/000575 filed 30 Apr. 2008, which designated the U.S. and claims the benefit of U.S. Provisional Application Ser. No. 60/924,168, filed May 2, 2007, the entirety of each of which is incorporated herein by reference.

FIELD AND BACKGROUND OF THE INVENTION

The present application relates to VTOL vehicles with multi-function capabilities and, specifically to ducted fan arrangements that facilitate the control of forces and flows of air and control movement of the vehicle in six degrees of freedom. The invention also relates to pitch control mechanisms for the lift propellers of VTOL vehicles: drive and transmission arrangements; the control of exhaust gases from such vehicles; and shock absorbing characteristics in the landing gear of such vehicles.

VTOL vehicles rely on direct thrust from propellers or rotors, directed downwardly, for obtaining lift necessary to support the vehicle in the air. Many different types of VTOL vehicles have been proposed where the weight of the vehicle in hover is carried directly by rotors or propellers, with the axis of rotation perpendicular to the ground. One well known vehicle of this type is the conventional helicopter which includes a large rotor mounted above the vehicle fuselage. Other types of vehicles rely on a multitude of propellers that are either exposed (e.g., unducted fans), or installed inside circular cavities, shrouds, ducts or other types of nacelle (e.g., ducted fans), where the flow of air takes place inside ducts. Some VTOL vehicles (such as the V-22) use propellers having their axes of rotation fully rotatable (up to 90 degrees or so) with respect to the body of the vehicle. These vehicles normally have the propeller axis perpendicular to the ground for vertical takeoff and landing, and then tilt the propeller axis forward for normal flight. Other vehicles use propellers having nearly horizontal axes, but include aerodynamic deflectors installed behind the propeller which deflect all or part of the flow downwardly to create direct upward lift.

A number of VTOL vehicles have been proposed in the past where two or four propellers, usually mounted inside ducts (i.e., ducted fans), were placed forwardly of, and rearwardly of, the main payload of the vehicle. One typical example is the Piasecki VZ-8 'Flying Jeep' which had two large ducts, with the pilots located to the sides of the vehicle, in the central area between the ducts. A similar configuration was used on the Chrysler VZ-6 and on the CityHawk flying car. The Bensen 'Flying Bench' uses a similar arrangement. The Curtiss Wright VZ-7 and the Moller Skycar use four, instead of two, thrusters where two are located on each side (forward and rear) of the pilots and the payload, the latter being of a fixed nature at the center of the vehicle, close to the vehicle's center of gravity.

The foregoing existing vehicles are generally designed for specific functions and are therefore not conveniently capable of performing a multiplicity of functions.

Patents owned by the present assignee that relate to VTOL vehicles include U.S. Pat. Nos. 6,464,166; 6,568,630; 6,817,570; 7,246,769; and 7,275,712. Printed U.S. Publications relating to similar subject matter include 2006/0113426; 2007/0034734; 2007/0034739; 2007/0095971; and 2008/0054121.

SUMMARY OF THE INVENTION

An object of the present invention is to provide a vehicle of a relatively simple construction and yet capable of performing a multiplicity of different functions.

According to one exemplary embodiment, there is provided a vehicle comprising a fuselage having a longitudinal axis and a transverse axis; at least one lift-producing propeller (also synonymously referred to sometimes as a prime mover, fan, rotor, or simply, propeller) mounted within a duct carried by the fuselage on each side of the transverse axis; and, if the vehicle is manned, a pilot's compartment formed in the fuselage between the lift-producing propellers. The optional pilot's compartment may be aligned with the longitudinal axis, or offset to one side of the axis, and, optionally, another compartment may be provided on the opposite side of the longitudinal axis.

Several exemplary embodiments are described below wherein the fuselage also carries a pair of thrusters (fans or other means by which the vehicle is moved in a forward direction) at the rear end of the fuselage, on opposite sides of the longitudinal axis. Various drive arrangements are disclosed for powering the lift-producing propellers and possibly the thrusters.

The invention described herein also relates to controlling actuation forces related to the vehicle lift-producing propellers and thrusters, including arrangements for changing propeller pitch, and controlling exhaust gases exiting the engine.

Also described herein is a system whereby primary and secondary modes of operation are provided for each of six degrees of freedom of VTOL vehicle movement.

Additional features relate to synchronizing and actuation of landing gears in order to improve stability and reduce the forces acting on the vehicle upon landing.

Another feature relates to splitting the shafts of the transmission system to improve stability and utilization of space in the vehicle design.

Further features and advantages of the invention will be apparent from the description below. Some of those describe unique features applicable in any single or multiple ducted fan and VTOL vehicles.

Accordingly, in one aspect, the invention relates to a ducted air flow vehicle comprising: a fuselage having a longitudinal axis, said fuselage supporting at least one forward duct and one aft duct having respective fore and aft mounted propellers arranged to force surrounding air into the ducts, and out of the ducts through respective outlets at lower ends of the ducts thereby creating a lift force; wherein the fore and aft mounted propellers have a pitch control system including respective pitch-change levers, with a mechanical connection between the pitch change levers configured such that when the mechanical connection is shortened or lengthened, blade pitch angles of the fore and aft propellers are caused to increase or decrease in a substantially similar direction and magnitude to thereby control up and down (heave) motion of the vehicle; and when the mechanical connection is externally acted upon substantially longitudinally so as to cause it to translate in a fore-aft direction without being shortened or lengthened, the blade pitch angles of the propellers are caused to change differentially and in opposite directions to thereby control pitch of the vehicle.

In still another aspect, the invention relates to a ducted air flow vehicle comprising: a fuselage having a longitudinal axis, the fuselage supporting at least one forward duct and one aft duct having respective forward and aft mounted propellers arranged to force surrounding air into the ducts, and out of the ducts through respective outlets at lower ends of the ducts thereby creating a lift force; wherein the forward and aft mounted propellers have a pitch control mechanisms with a mechanical connection between the pitch control mechanisms, the mechanical connection comprising a first dual action actuator for controlling heave of the vehicle connected at one end to a push pull rod operatively connected to the forward propeller and at an opposite end to another push pull rod operatively connected to the aft propeller, and a second actuator for controlling pitch of the vehicle connected at one end to the first actuator and at an opposite end to the fuselage.

In still another aspect, the invention relates to a ducted air flow vehicle comprising: a fuselage having a longitudinal axis, supporting at least one forward duct and one aft duct, the ducts having respective lift producing propellers arranged to force surrounding air through the ducts thereby creating a lift force, the respective lift producing propellers lying in a common plane; and a substantially airfoil-shaped compartment located between the forward and aft ducts, the forward duct having an opening adjacent the compartment, and the compartment oriented upward such that a gap is created between the forward end of the compartment and the tips of the blades of the forward propeller.

In still another aspect, the invention relates to a ducted air flow vehicle comprising: a fuselage having a longitudinal axis, supporting at least one forward duct and one aft duct, the ducts having respective lift producing propellers arranged to force surrounding air through the ducts thereby creating a lift force; a central area formed in the fuselage between the forward and aft ducts housing a propulsion unit powering the lift-producing propellers, the propulsion unit having an exhaust pipe opening through an upper surface of the fuselage in the central area, wherein the exhaust pipe is formed with an outlet oriented to flow exhaust gases in a rearward direction, substantially parallel to and along the upper surface.

In still another aspect, the invention relates to a ducted air flow vehicle comprising: a fuselage having a longitudinal axis, supporting at least one forward duct and one aft duct, the ducts having respective lift producing propellers arranged to force surrounding air through the ducts thereby creating a lift force; a central area formed in the fuselage between the forward and aft ducts, the central area having a substantially airfoil shape; and means for achieving a wing-in-ground (WIG) effect between the fuselage and ground or other surface over which the vehicle is flying.

In still another aspect, the invention relates to a ducted air flow vehicle comprising a fuselage having a longitudinal axis, supporting at least one forward duct and one aft duct, the ducts having respective lift producing propellers arranged to force surrounding air through the ducts thereby creating a lift force; landing gear comprising at least two ground-engaging components, each rotatably mounted on a strut secured to the fuselage for pivoting movement, and each having a shock absorber including a piston and a cylinder, the cylinder connected at one end to the fuselage and the piston connected at a free end thereof to the strut, the shock absorber adapted to absorb landing impact; and means for operating each said shock absorber to delay substantial shock absorption until both of said ground-engageable components contact the ground.

In still another aspect, the invention relates to ducted air flow vehicle comprising: a fuselage having a longitudinal axis, supporting at least one forward duct and one aft duct, the ducts having respective lifting fans arranged to force surrounding air into the ducts and out of an outlet at a lower end of each of the ducts thereby creating a lift force; a pair of thrusters supported at a rearward end of the vehicle, on opposite sides of the longitudinal axis, driven by respective first and second engines; and a drive unit including first and second transmissions connected between the first and second engines, respectively, and a first gear box operatively connected to the aft lifting fan; and a three-segment drive shaft extending between the first gear box and a second gear box operatively connected to the forward lifting fan, the three-segment drive shaft comprised of forward, middle and rearward segments, at least two of which lie in a different plane.

In still another aspect, the invention relates to ducted air flow vehicle comprising:

a fuselage having a longitudinal axis, supporting at least one forward duct and one aft duct, the ducts having respective lift producing propellers arranged to force surrounding air through the ducts thereby creating a lift force, the ducts each having front, rear and side openings selectively movable between open and closed positions;

a plurality of adjustable control vanes extending across inlets to the ducts, in a direction substantially parallel to the longitudinal axis;

a pair of thrusters supported in an aft location on the fuselage; and control means for:

a. effecting motion in a first horizontal direction in a first longitudinal degree of freedom (X) of the vehicle in a primary mode of operation through varying of thrust output of the thrusters, and in a secondary mode of operation through tilting of the vehicle in Pitch ($\Theta$), thereby creating a horizontal and longitudinal vector component of the lift force in the first direction;

b. effecting motion in a second horizontal direction substantially perpendicular to the first direction, in a second lateral degree of freedom (Y) of the vehicle in a primary mode through deflecting the control vanes, and in a secondary mode of operation through tilting of the vehicle in Roll ($\Phi$), thereby creating a horizontal and lateral vector component of the lift force in the second direction; and c. effecting motion in a third vertical direction substantially perpendicular to the first and second directions in a third vertical degree of freedom (Z) of the vehicle in a primary mode through direct variation of the lift force generated by the lift-producing propellers, and in a secondary mode through adjusting the control vanes, or adjusting the openings, to thereby affect flow of air through said ducts and the vertical lift force in the third direction.

The invention further relates to control means for:

a. effecting yaw motion of the vehicle in a fourth degree of freedom ($\Psi$) in a primary mode of operation through adjustment of the control vanes, and in a secondary mode of operation through asymmetric operation of the thrusters;

b. effecting roll motion of the vehicle in a fifth degree of freedom ($\Phi$) in a primary mode through similar symmetric adjustment of the control vanes in each of the fore and aft ducts, and in a secondary mode through asymmetric adjustment of the control vanes; through moving openings on one side of the ducts to an open position; or by adjustment of openings in the front and rear openings of the forward and aft ducts differentially on one side relative to the other side; and c. effecting pitch motion of the vehicle in a sixth degree of freedom ($\Theta$) in a primary mode through control of the lift-producing propellers and in a secondary mode through adjusting the control vanes differentially between the fore and aft ducts; opening or closing of the side openings uniformly in one of the forward and aft ducts; or through opening or closing of the front and rear openings uniformly in one of the forward and aft ducts.

In still another aspect, the invention relates to a ducted air flow vehicle comprising: a fuselage having a longitudinal axis, supporting at least one forward duct and one aft duct, the ducts having respective lift producing propellers arranged to force surrounding air through the ducts thereby creating a lift force; a plurality of adjustable control vanes extending across inlets to the ducts, in a direction substantially parallel to the longitudinal axis; a pair of thrusters supported in an aft location on the fuselage; and control means for producing movement of the vehicle in each of six degrees of freedom by a first group of primary control elements, and alternatively, by a second group of secondary control elements.

The invention will now be described in connection with the drawing figures identified below.

BRIEF DESCRIPTION OF THE DRAWINGS

FIGS. 19A and 19B show primary and secondary control modes for vehicle movement in a vertical direction along an axis Z;

FIGS. 20A and 20B show primary and secondary control modes for movement of the vehicle in Roll;

FIGS. 21A and 21B show primary and secondary control modes for movement of the vehicle in Yaw;

FIGS. 22A and 22B show primary and secondary control modes for movement of the vehicle in Pitch;

DETAILED DESCRIPTION OF THE INVENTION

Figure 1:
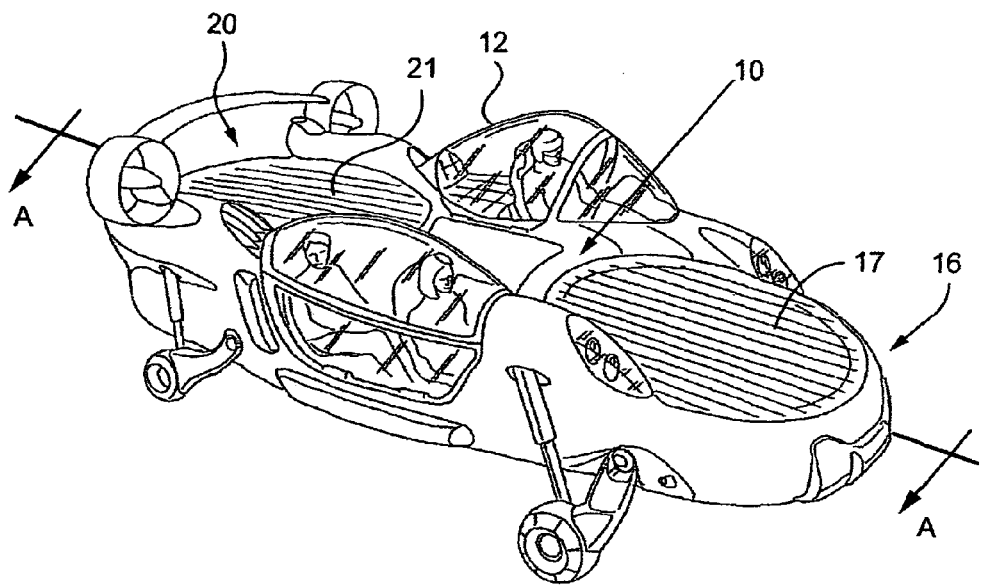
FIG. 1 is a perspective view of a VTOL vehicle in accordance with a known configuration.
Figure 2:
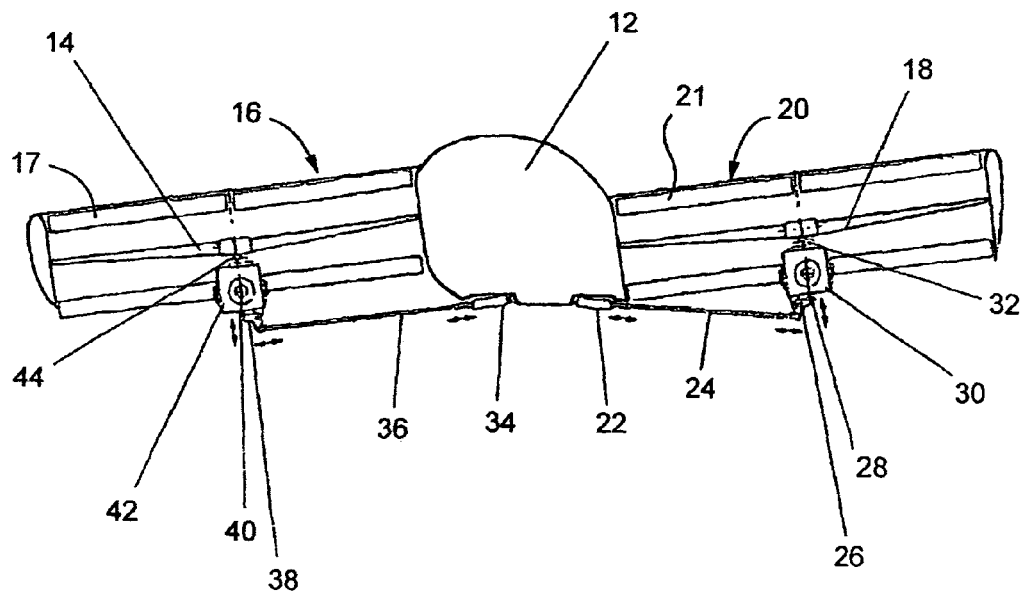
FIG. 2 is a schematic cross section taken along the section line A-A in FIG. 1, but with the rear thrusters omitted.

FIGS. 1 and 2 schematically illustrate one example of a ducted fan vehicle 10 having an optional compartment 12 (which may or may not be a pilot's cockpit) located between a forward lift producing propeller 14 in a forward duct 16 and an aft lift producing propeller 18 in an aft duct 20. Inlets to the ducts 16 and 20 are provided with adjustable control vanes 17 and 21, respectively, which extend substantially parallel to the longitudinal axis of the vehicle. At least one of the lift-producing propellers has variable pitch which is controlled by means such as, for example, an actuator 22 with its moving part connected to a rod (or shaft) 24 which is also linked to a bell crank 26, which is a mechanism that changes the direction of the movement by transforming the motion of the rod into a different motion at another point of the bell crank 26, which is in turn connected to a push pull rod 28. The push pull rod 28 moves through an opening in a transmission unit 30 (or by it) and is connected to a pitch control mechanism 32 of the propeller 18. Similarly, the mechanism for the forward duct 16 includes an actuator 34 with its moving part connected to rod (or shaft) 36 which is also linked to bell crank 38, transforming the motion of the rod 36 into a different motion at the other point of the bell crank 38, which is in turn connected to a push pull rod 40 that moves through an opening in transmission unit 42 (or by it) and is connected to a pitch control mechanism 44 of the propeller 14.

It should be appreciated that both the pitch and heave of the vehicle can be controlled by change in pitch angle of the propellers 14 and 18. In this regard, each of the pitch control mechanisms of the forward and aft propellers is subject to substantial forces acting on it while it must overcome the forces generated by the resistance of the rotating propellers typically as high as 2000 pounds for a vehicle that features a similar typical takeoff weight. The forces acting independently on each one of the actuation mechanisms can be either of different magnitude when there is a need to differentiate between the aft and the forward propellers for angular pitch control of the vehicle, or of similar magnitude for heave control of the vehicle which requires substantially a similar pitch angle change at both propellers. It should be also noted that, in general, the pitch control of the vehicle is responsible for the stabilization of the vehicle in pitch and requires substantial rapidity in action and sensitivity to response time, whereas heave control of the vehicle can be slower in terms of response time as the requirements for precise height of the vehicle are not as severe as for precise angularity. Since each of actuators 22 and 34 must both participate in the pitch control of the vehicle, they therefore must be fast reacting as well as being subjected to the high forces which means they must both endure high power requirements.

Figure 3:
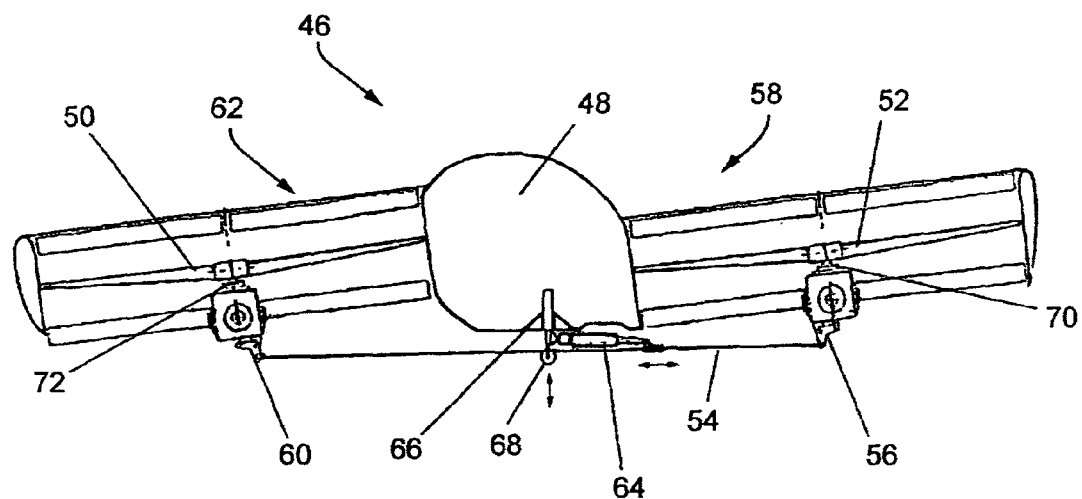
FIG. 3 is a schematic representation of an exemplary pitch adjustment configuration that could be incorporated in the vehicle of FIGS. 1 and 2 in accordance with an exemplary but nonlimiting embodiment of the invention.

FIG. 3 is a schematic cross section of a ducted fan vehicle 46 with a compartment 48 having a pitch control system in which the mechanisms of the forward propeller 50 and the aft propeller 52 are connected between them by at least one part, which in this example is a cable 54 connecting a bell crank 56 at the aft duct 58 to a bell crank 60 at the forward duct 62; and two actuators corresponding to the two pitch control mechanisms wherein the actuator 64, which is attached to cable 54 on one end and to actuator 66 on another end, can move back and forth substantially parallel to the cable 54; and actuator 66 which engages the cable 54 through a pulley 68 or through equivalent component enabling relative freedom of motion, can move back and forth substantially vertically. Note that in FIG. 3, the transmission units and push pull rods are as shown in FIG. 2.

In an alternative arrangement, the actuator 64 may be attached, for convenience, to the vehicle body/compartment, and not necessarily to the moving rod of actuator 66. While this may cause the actuator 64 to sway slightly from horizontal when actuator 66 moves, any secondary effect on pitch command (which will be small) will be corrected by the flight control system.

Cable 54 is kept at initial tension connecting the pitch control mechanisms 70, 72 of the two propellers, whereas the heave control of the vehicle is achieved by travel of actuator 66 back and forth which changes the distance between the bell cranks 56, 60 of the two rotors (or propellers) thereby activating in unison the pitch control mechanisms 70, 72 of the propellers, respectively, at substantially similar direction and magnitude. Pitch control of the vehicle is achieved by travel of actuator 64 back and forth activating the push pulls of the respective pitch control mechanisms 70 and 72 of the propellers differentially at opposite directions to each other. In addition, the forces due to the forward and aft propellers are cancelled out through the cable 54, and thus reducing substantially the operating forces required of actuator 64. The heave control actuator 66 provides most of the force required to change and sustain the rotor pitch angle; however, it requires substantially less force (by traveling at longer distance) than would be required from each of actuators 22 and 34 in the system described in FIG. 2 hereinabove, as evident from the geometry of the system, while the pitch control actuator 64 requires minimal force to provide only for differential changes in the pitch of the propellers at any given position of the heave control actuator. Another advantage of this configuration is that by separating the tasks required from each of the actuators, they now require less power than would be needed for the actuators in the system described in FIG. 2 hereinabove. Another advantage is the ability to mechanically control the pitch of both rotors in case of need or emergency by a relatively simple two degrees of freedom means, such as, for example, mechanical rods or cables added to the actuators externally and connected to levers to be used mechanically by the pilot in the event of malfunction of one or more of the actuators 64 and 66, respectively.

Figure 3A:
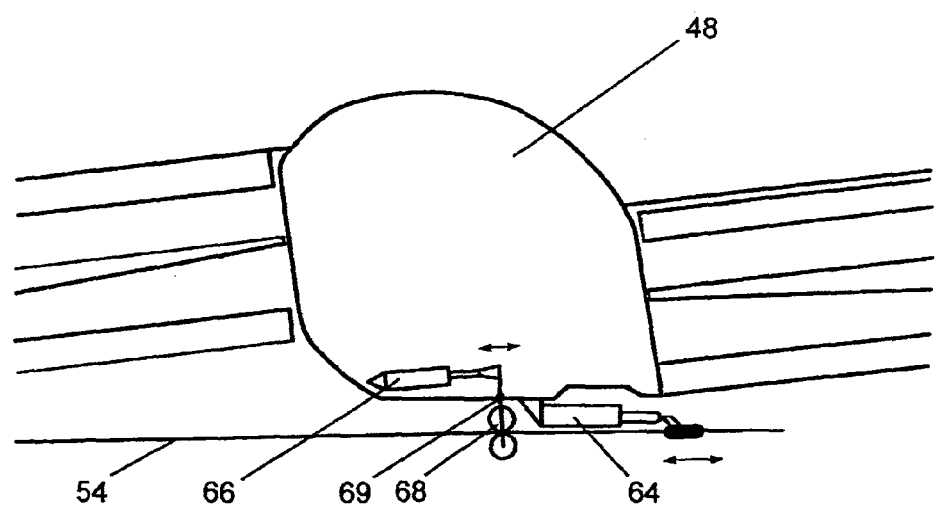
FIGS. 3A, 3B and 3C illustrate an alternative pitch adjustment configuration
Figure 3B:
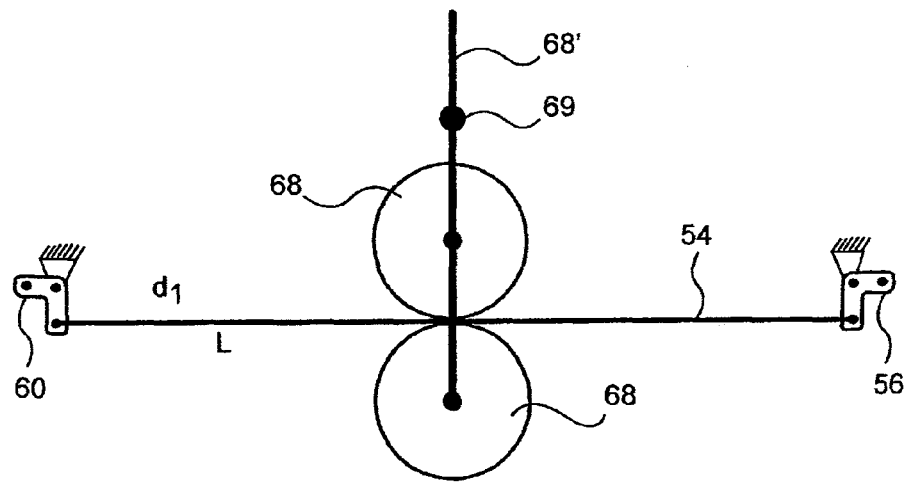
Figure 3C:
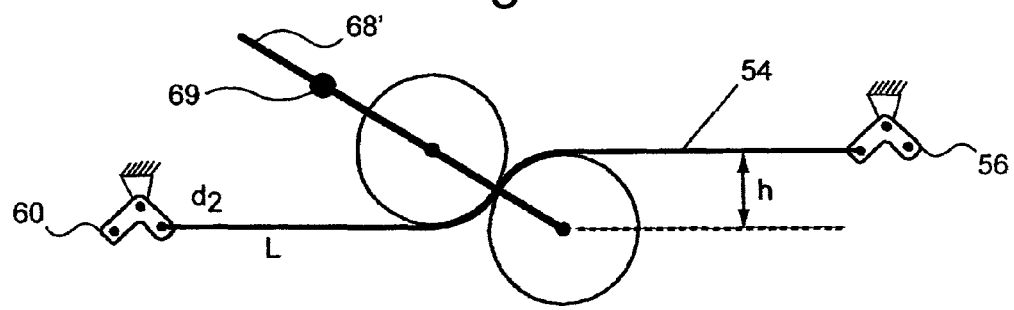

FIG. 3A schematically illustrates the actuator 66, which was vertically mounted in FIG. 3, mounted horizontally and engaging cable 54 through a double pulley mechanism 68 including a control shaft 68' hinged to a fixed point in the fuselage at 69. FIGS. 3B and 3C are schematic details of the double pulley mechanism 68 and cable 54 which has a fixed length L. In FIG. 3B, cable 54 connecting between bell cranks 56 and 60 is straight and has a horizontal distance between the bell cranks d1 equal to the cable length L. When the pulley mechanism 68 is tilted about pivot 69 due to the horizontal movement (to the left in the Figure) of the piston of actuator 66 as shown in FIG. 3C, cable 54 is wrenched over the pulleys and is divided into two sections, with a vertical distance h between them. The "loss" of cable to the vertical component yields a horizontal distance between the bell cranks d2 shorter than distance d1 of FIG. 3B.

It will be understood that the "zero" or neutral position for the pulleys 68 relative to the cable 54 does not necessarily have to be as shown in FIG. 3B, with no cable deformation. Instead, some angularity can be established in the cable via setting of the control shaft 68' at a neutral position that is offset from vertical, or by offsetting the pulleys 68 on the control shaft. In this way, higher gain in the transfer of motion between actuator 66 and the bell cranks 56 and 60 may be achieved. It will be also understood that hinge point 69, as long as it is connected to the fuselage can be positioned also lower than the compartment floor or anywhere, including in line with the cable 54, to obtain the desired lever ratio for the actuator 66 and motion of pulleys 68.

Figure 4:
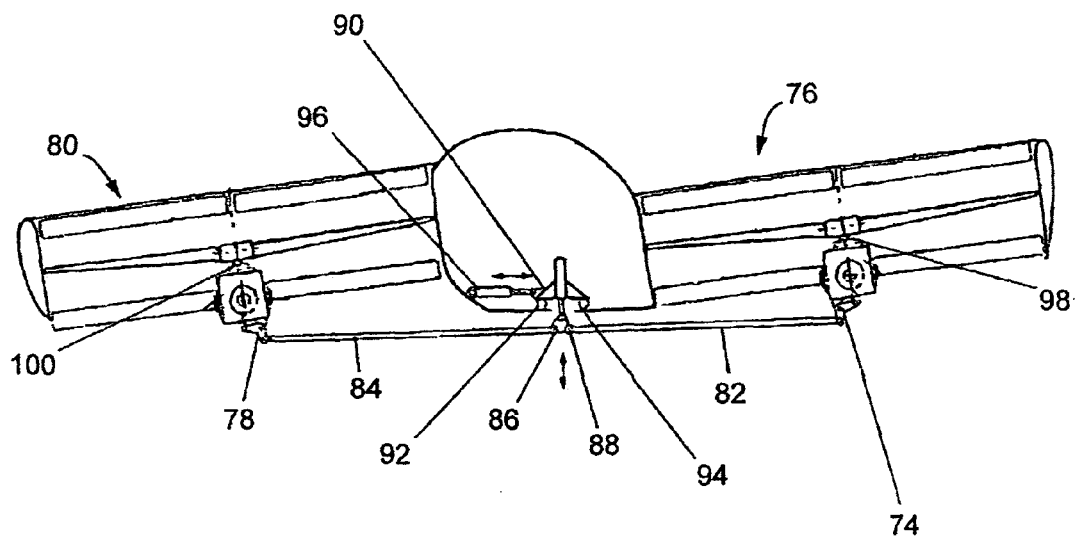
FIG. 4 is a schematic representation of still another exemplary pitch adjustment configuration.

FIG. 4 schematically illustrates another preferred embodiment to achieve similar effects to those described in FIG. 3. The bell crank 74 of the aft rotor 76 and bell crank 78 of the forward rotor 80 are connected to push pull rods 82 and 84, respectively, such rods linked to a connecting element 86 which is connected to actuator 88 which can translate substantially longitudinally as shown schematically by cradle 90 and rollers 92 and 94, and which is also connected to another actuator 96. Actuator 88 can control the vehicle's heave by pulling and pushing the element 86 which changes the geometric distance between the bell cranks of the two rotors thereby activating the push pulls of the pitch control mechanisms 98 and 100 of the propellers respectively at substantially similar direction and magnitude, whereas actuator 96 can control the vehicle's pitch by pulling or pushing the actuator 88 which is connected to element 86 causing it to travel back and forth activating through bell cranks 74 and 78 respectively the push pulls of the pitch control mechanisms 98 and 100 of the propellers differentially at opposite directions to each other. In addition, the forces due to the forward and aft propellers are cancelled out through rods 84 and 82, and thus reduce the operating forces required of actuator 96. The various drive components including the transmission units, push pull rods, and propellers are otherwise similar to those in FIGS. 2 and 3.

Figure 5:
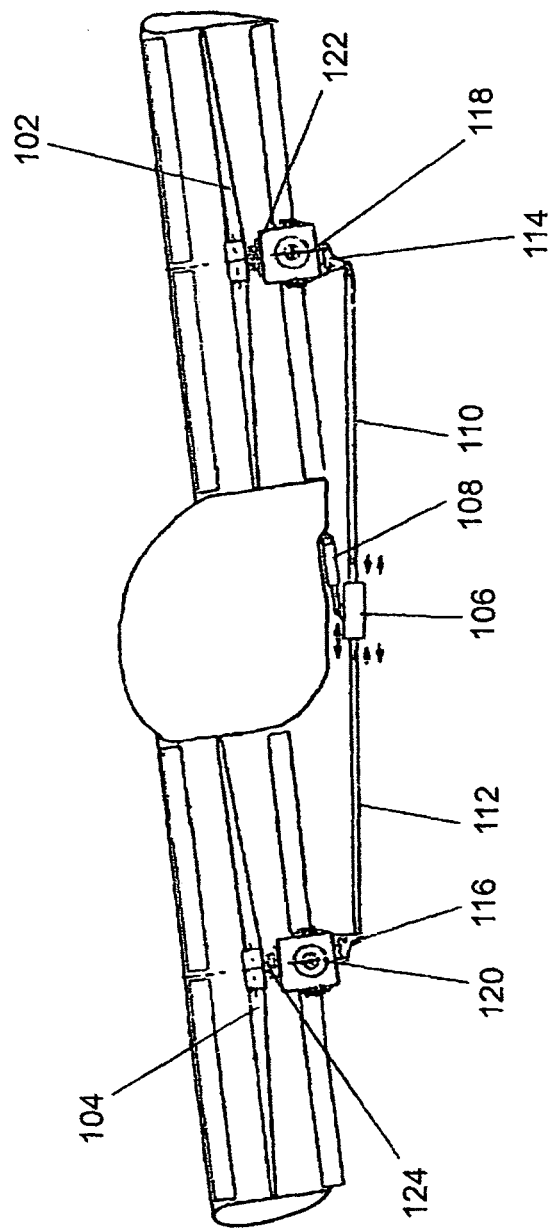
FIG. 5 is a schematic representation of still another pitch adjustment configuration.

FIG. 5 illustrates another preferred embodiment of the pitch control mechanism of the vehicle in which the actuation mechanism common to the two propellers 102 and 104 consists of a substantially linear actuator 106 which, for example, can be a dual action actuator (or several combined actuators)

able to control the heave of the vehicle, and another actuator 108 connected to the first actuator 106 able to control the differential pitch change whereas both actuators move substantially horizontally to affect through the connecting rods 110 and 112, bell cranks 114 and 116, and push pull rods 118 and 120, the respective pitch controls 122 and 124 of the propellers. The transmission units are similar to those described above in connection with FIGS. 2, 3 and 4.

It should be appreciated that the control system examples described herein above can be of different mechanisms forms and components such as, for example, mechanical, hydraulic, electric, pneumatic or their combinations thereof, and the vehicle can also be configured with its propellers fully or partially without ducts.

Figure 6:
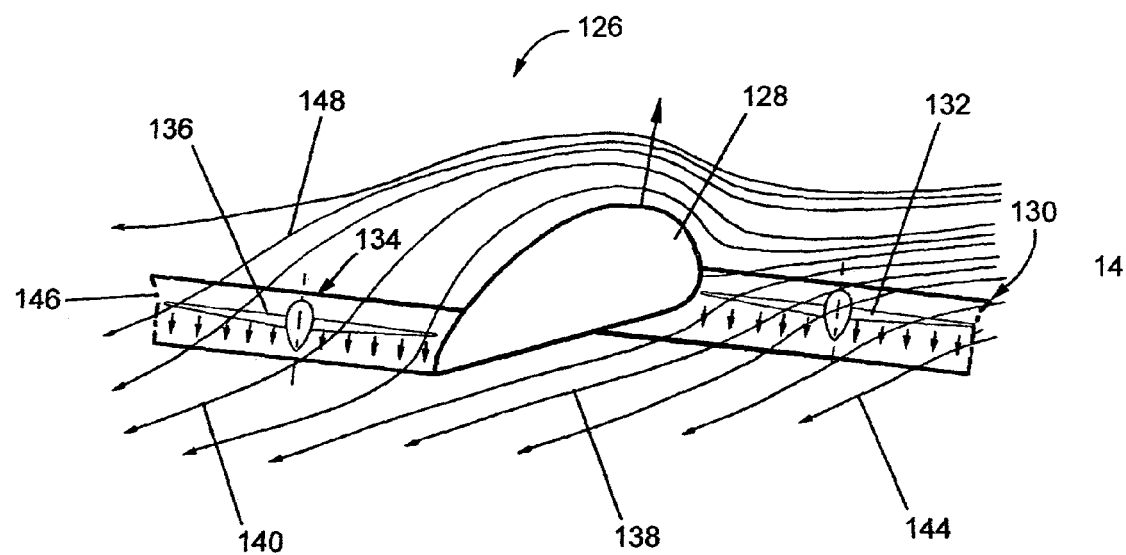
FIGS. 6-9 schematically illustrate air flow patterns in variously arranged ducted fan configurations in accordance with exemplary aspects of the invention.

FIG. 6 illustrates schematically a vehicle 126 having a compartment 128 located between a forward duct 130 enclosing a lift producing propeller 132 and an aft duct 134 enclosing a lift producing propeller 136 while in forward flight with airflow streamlines 138 and 140 through the substantially top and bottom openings of the ducts, wherein opening 142 in the forward facing side of the forward duct enables the external airflow 144 to penetrate the forward duct and opening 146 in the aft facing side of the aft duct 134 enables the internal airflow 148 to exit the aft duct 134. This embodiment allows for improved airflow in forward flight resulting in reductions in airflow separation drag and momentum drag, and the two lift producing propellers 132 and 136 are positioned in different planes with respect to their vertical axes, and their ducts are tilted with respect to the horizon in forward flight to further improve forward flight.

Figure 7:
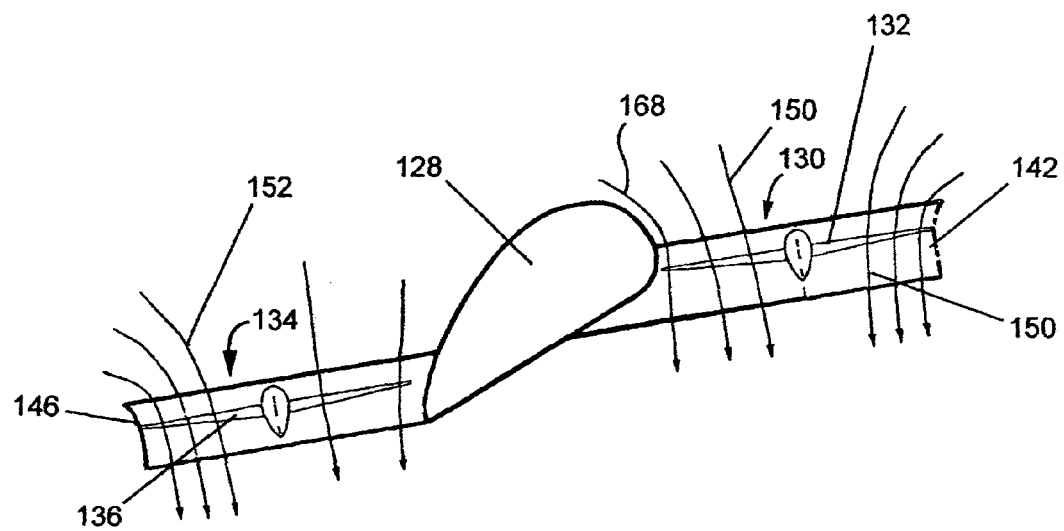

FIG. 7 shows the vehicle described in FIG. 6 in hover position wherein the side openings 142 and 146 in the forward and the aft ducts 130, 134, respectively, are in closed positions, hence air enters the ducts only through the upper inlet openings with streamlines shown as 150 and 152, respectively.

Figure 8:
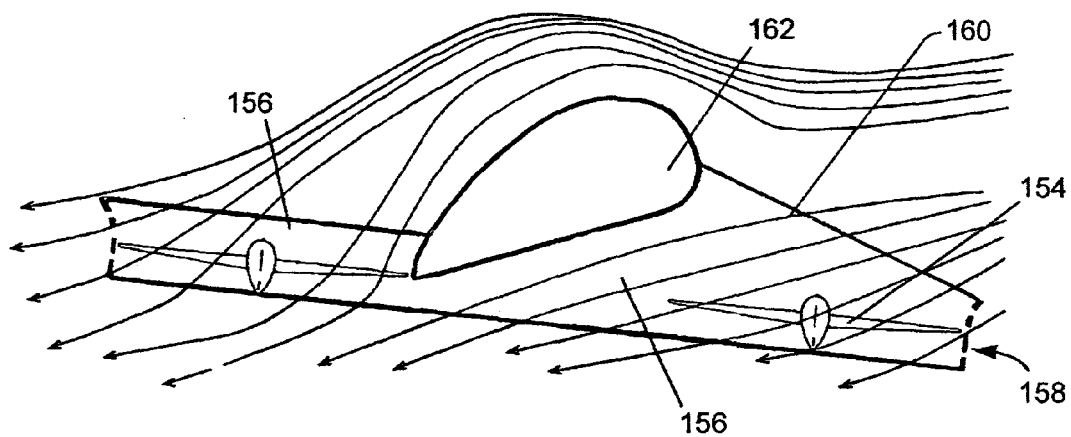

FIG. 8 illustrates a vehicle similar to that described in FIG. 6 wherein the forward propeller 154 is lowered to align with the aft propeller 156 so that they are positioned substantially in the same plane with respect to their horizontal axes, and with corresponding lowering of the forward duct 158 with its upper outer wall projected as 160, which configuration is advantageous over the arrangement of the propellers in different planes, as in FIG. 6, with respect to the potential simplicity of the transmission system of the vehicle in case, for example, that the two propellers are to be connected to the same propulsion unit which may be located between the two propellers substantially aligned with the longitudinal axis of the vehicle, enabling a relatively simple system with a 180° shaft connecting the two propellers. It will be appreciated that in this configuration, the forward propeller 154 is not anymore fully surrounded by a duct structure at its aft side but has an unenclosed gap 156 below the compartment or cabin 162. It will be further appreciated that the relocation of the propeller, which may simplify the transmission and other related systems of the vehicle, does not materially change the local air streamlines in forward flight which remain substantially similar to those described in FIG. 6.

Figure 9:
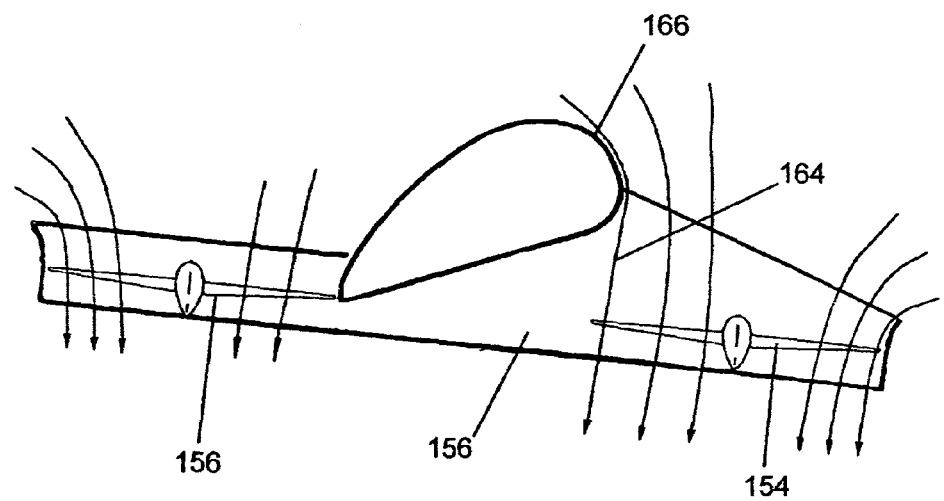

FIG. 9 illustrates the vehicle shown in FIG. 8 when in hover position with air streamlines 164 by the gap 156 traveling downward in substantially uniform line due to the download suction created by the rotor 154 as if there was a duct wall present instead of the gap. It will also be appreciated that the low pressure zone 166 at the upper side of the cabin is generally unaffected compared to zone 168 of the configuration of FIG. 7.

Figure 10:
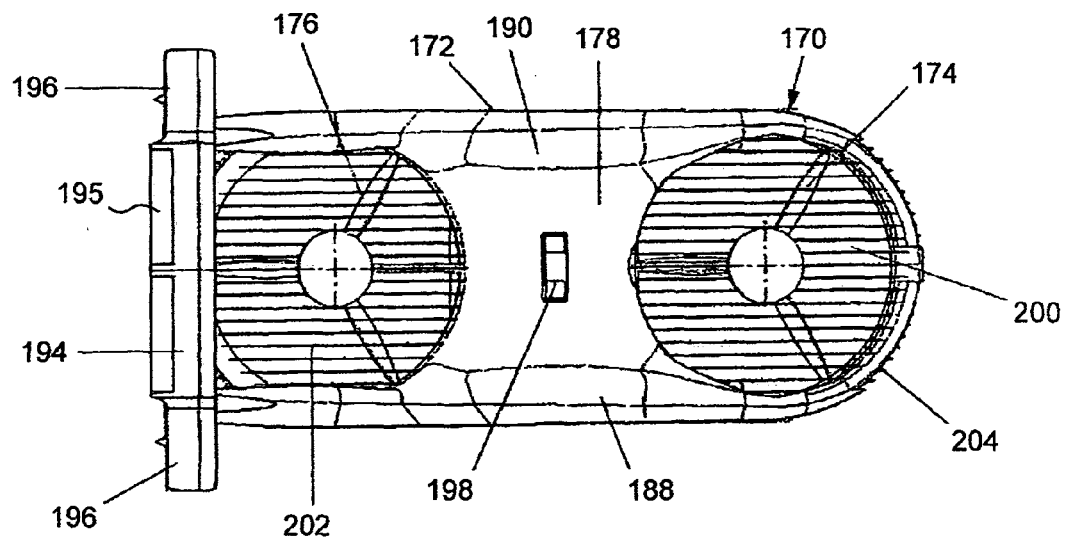
FIG. 10 is a top plan view of a ducted fan vehicle in accordance with another exemplary embodiment.
Figure 11:
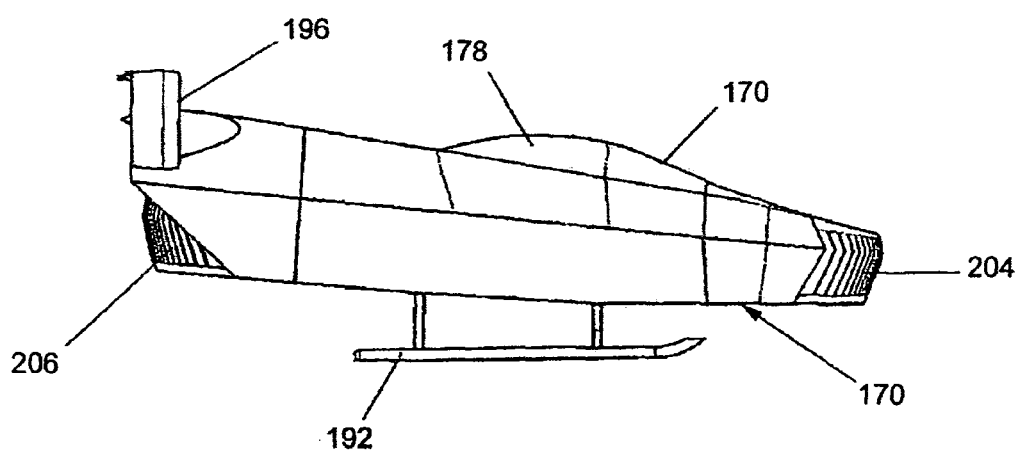
FIG. 11 is a side elevation view of the vehicle shown in FIG. 10.
Figure 12:
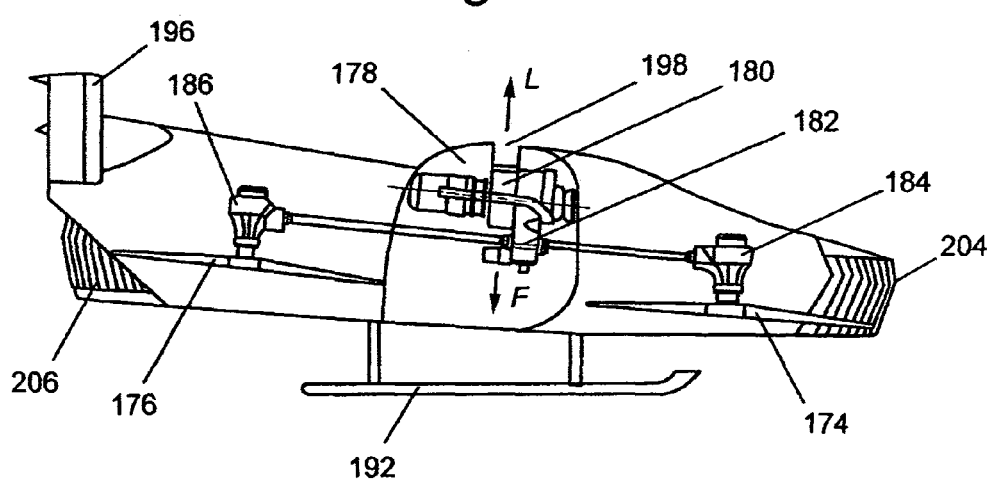
FIG. 12 is a side elevation similar to FIG. 11, but partly in section.

FIGS. 10-12 illustrate respectively a top view, a side view and a cross section of a ducted fan vehicle 170 which can be either manned or unmanned, comprising a fuselage 172 having a longitudinal axis and a transverse axis and including two lift-producing rotors or propellers 174 and 176 carried at the opposite ends of the fuselage along its longitudinal axis, and on opposite sides of its transverse axis, extending vertically through the fuselage 172 and rotatable about vertical axes to propel the air substantially downwardly and thereby to produce an upward lift. The vehicle further includes a central area 178 formed in the fuselage 172 between the lift-producing propellers 174 and 176 and substantially about the longitudinal axis of the fuselage. The central area 178 may be sized so as to accommodate a propulsion unit 180 with internal or external transmission unit 182 connecting to the two gearboxes 184 and 186 of the front and aft propellers respectively. A pair of bays 188 and 190 are formed in the fuselage 172 laterally on the opposite sides of the central area 178 and between the lift-producing propellers. The vehicle further includes a landing gear 192 mounted below the fuselage which can be, for example, wheels or skids, and a rear aerodynamic stabilizing surface 194 which can have movable flaps 195 generally placed between two thrusters 196 which can be ducted or unducted fans or other propulsion units. When the propulsion unit 180 is located inside a substantially closed section of central area 178, a pipe or another channeling device with opening 198 is provided about the top of the closed section of the central area 178 to enable the exhaust gases to escape to the outside. The gases escape at high temperatures typically in the ranges of 800 degrees Celsius. The upward exhausted gases exiting at high speed carry with them a downward reaction force F on the vehicle which reduces the load carrying capability of the vehicle and also disturb the substantially smooth airflow aligned with the forward flight stream lines on the top of the vehicle when in forward flight as for example was shown in FIG. 6 hereinabove. It should be appreciated that if the hot exhaust gases are alternatively channeled to exit towards the bottom side of the vehicle it may enhance the load carrying capability of the vehicle but also increase the downward thermal signature of the vehicle, which is a significant design factor in military applications although of lesser significance in a civilian vehicle. The forward and aft ducts include vanes 200 and 202 located towards the inlet and outlet sides of the ducts to provide for control of the vehicle and side wall openings with louvers 204 and 206 to provide for improved forward flight and hover. The vehicle may also have other openings in the sides of the ducts walls for example pointing sideward such as 208 illustrated in FIG. 26 described further below.

Figure 13:
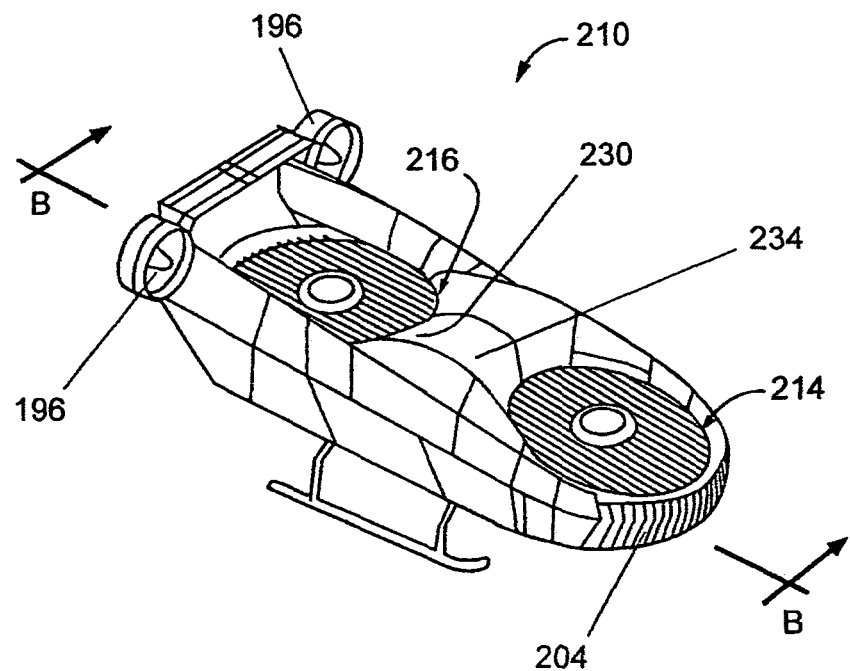
FIG. 13 is a perspective view of a VTOL vehicle in accordance with the invention.
Figure 14:
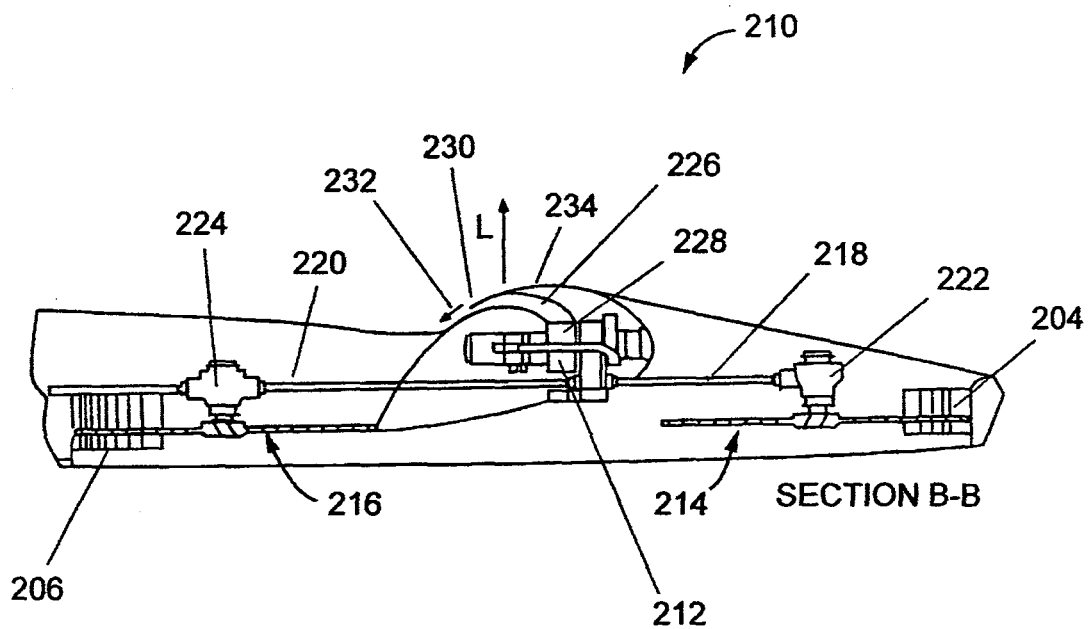
FIG. 14 schematically illustrates an exhaust gas flow configuration in the ducted fan vehicle shown in FIG. 13.
Figure 15:
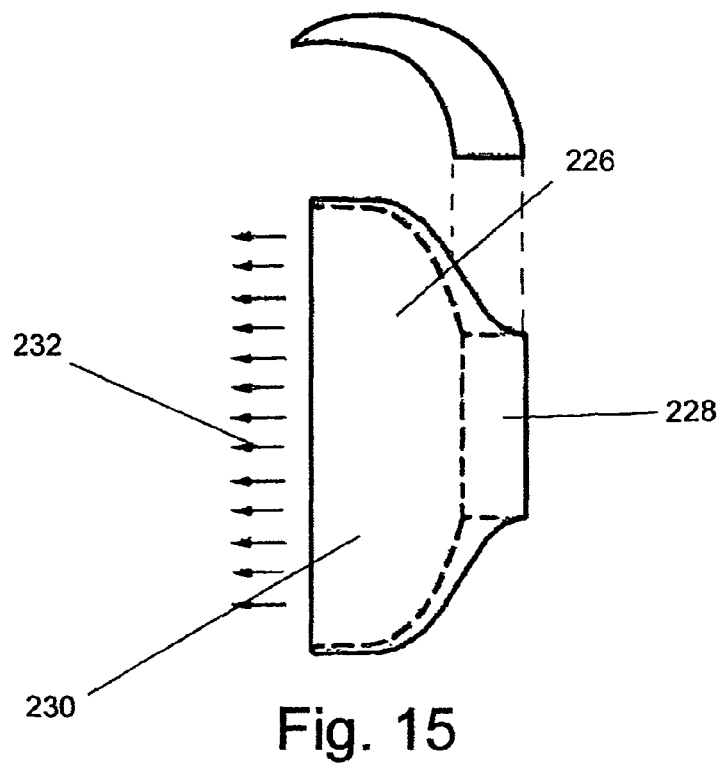
FIG. 15 are plan and side views of an exhaust gas duct in accordance with an exemplary embodiment of the invention.

FIGS. 13 and 14 schematically illustrate a ducted fan vehicle 210 having a turbo shaft propulsion unit 212 located between two ducted fans 214, 216 with simple 180° in line power transmission shafts 218 and 220 connecting to two fan gearboxes 222 and 224. Louvers 204, 206 and propulsion units 196 remain as shown in FIGS. 10-12. Also shown is an exhaust chamber 226 which is arched backward in order to turn and tilt the exhaust gases rearward and substantially parallel to the local upper surface of the vehicle. FIG. 15 illustrates top and side views of the exhaust chamber 226 which has a portion 228 of substantially rectangular cross section or of other shape as dictated by the engine exhaust interface near the engine side, and widens resembling a funnel while maintaining a substantially constant cross section or even expansion if required towards the outside forming a slot like section 230 at the exit of the gases from the vehicle. The blowing of the exhaust gases 232 substantially parallel to the upper surface of the central area 234 increases the local air velocity thereby reducing pressure and increasing the lift force L on the vehicle. It has been found that blowing of air and gases over the top of an airfoil at the cord wise location between 0.2 and 0.6 chord length provides further lift augmentation thereby increasing the total lift component compared to the lift where no blowing is present. It should also be noted that the additional energy injected into the airflow by the exhaust gases over the upper side of the central area 234 causes the separation if any to occur further aft hence delay the separation at the aft end of the central area 234 thereby reducing drag. Another advantage of the tilted gas flow embodiment is avoiding the downward acting force F shown in FIG. 12 and even gaining some propulsive forward moving force due to the horizontal vector component of the gas flow. In case of the propulsion unit 212 is able to accommodate a reduction in cross section area in the exhaust plenum this would be accompanied by higher gas exit velocities hence the propulsive force of said gases can be significantly increased. It will further be appreciated that the widening of the exhaust chamber 226 as described hereinabove increases its surface area which is in contact with the outside ambient air, hence increasing the heat transfer to better cool the exiting gases which is advantageous in keeping a lower thermal signature of the vehicle to lower its observability and at the same time increase its survivability against heat seeking missiles. Furthermore, the reduced gas temperature is also favorable to structure and other components of the vehicle especially the aft duct to lessen damage and wear.

Figure 16A:
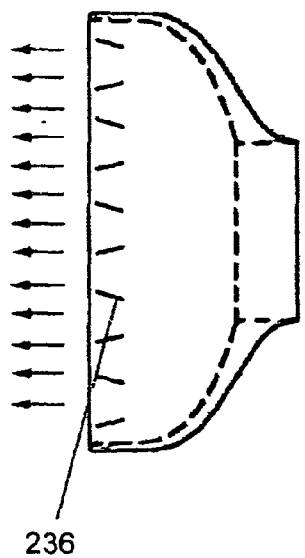
FIGS. 16A-16C show a plan view and a plan and aft enlarged section view of an exhaust gas duct similar to that in FIG. 15, but with turbulators added at and above the outlet end thereof, and showing the effect of the turbulators on gas flow.
Figure 16B:
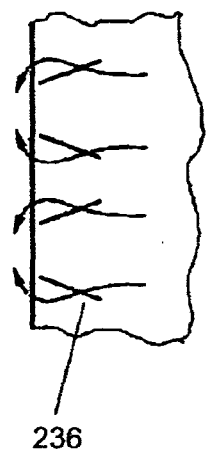
Figure 16C:
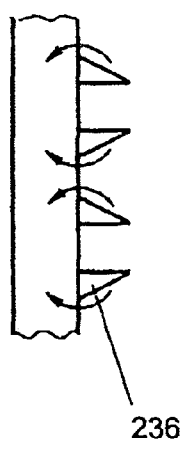

FIG. 16A-16C illustrate further mixing of the hot gases with the cold ambient airflow achieved by adding a row of vortex generators 236 added to the top surface of the exhaust chamber. Vortex generators are typically devices that create a usually small vortex which flows with a moving fluid over a surface which result in mixing of the ambient air with the exhaust gases, thereby further reducing the temperature of the exhaust gases, and thus further reducing the thermal signature of the vehicle. FIG. 16B is an enlarged detail of the vortex generators shown in FIG. 16A, illustrating how the exhaust gases are caused to mix with ambient air. FIG. 16C is an end view, showing the vortex generators atop the outlet end of the exhaust chamber, looking into the slot 230.

FIGS. 17A through 22B schematically demonstrate various modes and controls in up to the 6 primary degrees of freedom (DOF) X, Y, Z, Φ, Ψ, Θ in which, for vehicles as described herein, for each primary mode of control, there exists a secondary mode which can be used to enhance the primary mode in case of need for excessive control, for example when the primary mode is reaching its limits or when there is full or partial failure in the primary mode and the secondary mode is called in for augmentation; or when a combined use of the primary and secondary modes may be considered advantageous to the performance.

It should be understood on the context of the following discussion that VTOL vehicles described herein may have duct openings in the front and rear of the forward and aft ducts, respectively (see FIGS. 6, 8, 10-14, 28-30 and 38). These openings are adjustable by utilizing means such as, for example, moveable panels or louvers that allow the openings to be opened or closed with essentially infinite adjustments, and they may also be adjusted differentially in that the panels or louvers on one side of the center axis may be adjusted independently of the panels or louvers on the other side of the center axis. In addition, other VTOL vehicles described herein may also have front and rear side openings, i.e., openings in the forward and aft ducts that are located on the left and right sides of the fuselage (see FIGS. 37A, B and FIGS. 25-27). Accordingly, control of the movements of the vehicle in six degrees of freedom may be achieved at least in part, through adjustment of the front and rear openings in the forward and aft ducts, with or without additional openings in the sides of the ducts.

Figure 17A:
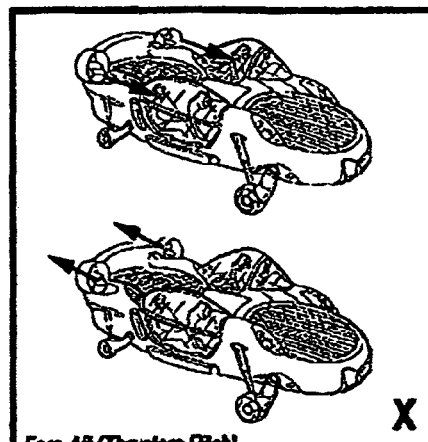
FIGS. 17A and 17B show primary and secondary control modes for vehicle movement in a longitudinal direction, along an axis X.
Figure 17B:
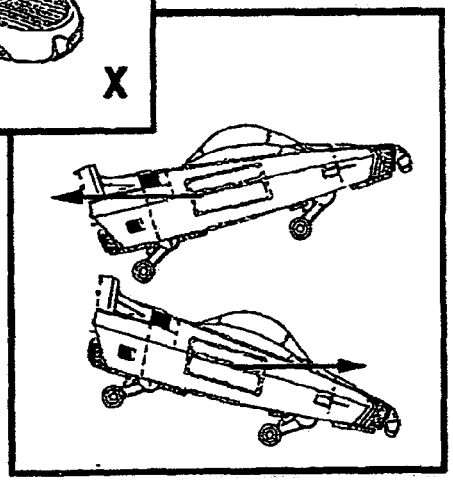

In FIG. 17A, the primary mode is the thruster control pushing the vehicle forward which in case of failure of one or more of the thrusters, or for purpose of increasing the forward velocity beyond that which can be obtained by the thrusters even if there is no malfunction. In FIG. 17B, the secondary mode is introduced by way of deliberate variations of the vehicle's pitch angle having a component of the lift vector aligned with the forward X axis thus affecting the forward and backward motion of the vehicle.

Figure 18A:
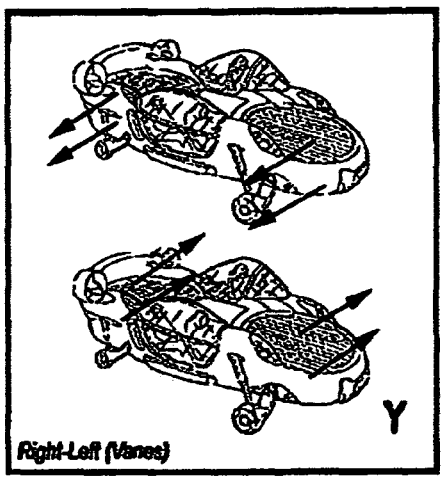
FIGS. 18A and 18B show primary and secondary control modes for vehicle movement in a lateral direction along an axis Y.
Figure 18B:
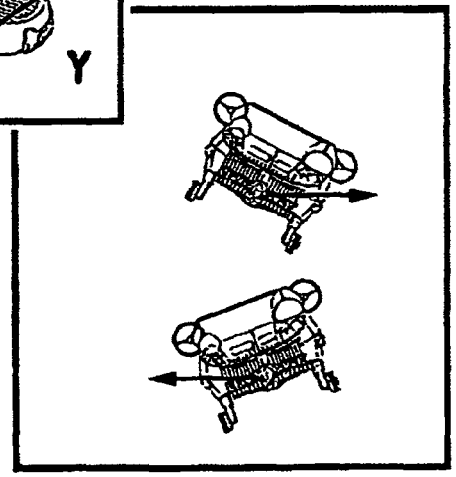

In FIG. 18A, the primary mode of control is the vanes controlling the lateral motion of the vehicle by their various tilts. In FIG. 18B, the secondary mode is rolling the vehicle so that the side component of the lift vector generated by the rotors is adding a lateral force component to move the vehicle.

In FIG. 19A, the primary mode of control is the amount of lift produced by the lift rotors controlling the vertical motion of the vehicle. In FIG. 19B, the secondary mode is the blocking effect of the vanes affecting the lift component by tilting the vanes preferably towards or away from each other, for example, such that the outflow through them is reduced and the overall drag of the vanes is increased. Alternatively, it can also be achieved by partially or completely opening in a uniform manner the openings in the duct walls to allow for airflow through them, thus reducing the airflow through the duct inlet over the ducts lips and hence reducing the lift augmentation of the ducts lips, thereby reducing the overall lift of the vehicle, or also by changing the revolutions per minute (RPM) of the rotors through the engine governor thereby affecting the lift. It should be appreciated that if increasing the engine RPM to a value that is higher than the setting necessary for a desired hover combined together with partial deployment of vanes blockage to reduce through airflow as described hereinabove, then the overall net lift of the vehicle can be maintained at substantially similar value as determined before increasing the RPM and tilting of the vanes to disturb the airflow while still retaining the ability to both climb and descend at will or to modulate the lift to obtain values both higher and lower than the nominal.

In FIG. 20A, the primary mode of control is the vanes controlling the roll rate of the vehicle and the secondary mode, shown in FIG. 20B, is asymmetric change of control vanes angles, and hence asymmetric airflows through the right and left sides of the duct, creating a roll moment about the longitudinal axis of the vehicle. It is also possible to use the side openings in the side walls of the ducts as secondary modes by opening them at only one side of the vehicle, hence causing asymmetric airflow over the duct lips of the right and left sides of the vehicle and thus creating a roll moment about the longitudinal axis of the vehicle.

In still another secondary mode, a partial asymmetric effect can be achieved by (either partially or fully) opening (if closed), or closing (if open) the front and rear louvers on just one side of the front and rear openings in the forward and aft ducts. While not as effective as having louvered openings on the sides of the ducts, this approach will nevertheless achieve good results for vehicles with only front and rear duct openings in the forward and aft ducts, respectively.

In FIG. 21A, the primary mode of control is the vanes controlling the yaw angle of the vehicle by different tilts of the forward and aft vanes, and the secondary mode, shown in FIG. 21B, is the asymmetric thrust from the thrusters achieved when operating them unevenly creating yaw of the vehicle.

In FIG. 22A, the primary mode of control is the pitch control of the lift rotors controlling the pitch rate of the vehicle, and the secondary mode of control, shown in FIG. 22B, is the vanes tilted to allow or block the airflow as explained in connection with FIG. 19B but in this case tilting only vanes of one of the ducts or by different tilts of the two ducts in order to create asymmetry between the ducts creating pitch moment about the transverse axis of the vehicle, or alternatively also by opening uniformly the openings in the sides of one of the forward and aft ducts to allow for air flow into the duct, thus reducing the airflow through the duct inlet over its lips, hence reducing the lift of the vehicle.

An alternative secondary mode for vehicles having only front and rear louvered openings in the forward and aft ducts, respectively, involves opening (or closing if open) either the entire front or rear louvered openings in the forward or aft ducts, respectively.

Thus, the ability of the vertical louvers to generate control forces and contribute to control in two degrees of freedom, coupled with the substantially lateral movement and yaw of the vehicle, also enable the vertical louvers to be used as secondary control modes for vehicle roll and pitch movement.

It should be appreciated that the designation of primary and secondary modes as explained hereinabove is for purpose of example and other modes and variations are possible, for example when for a given primary mode there exist more than one secondary mode option such as those illustrated in FIG. 19B for the vertical lift of the vehicle in which case rules of activation preferences can be created among the different modes such as sequence of activations or simultaneous activation of the secondary modes to gain further enhancement of a desired mode. Also the name designation can be changed among the modes so that a certain mode can be named primary at one point and secondary at another point. It should be further appreciated that through the physical and aeronautical features of the vehicle as illustrated for example in FIGS. 23-27 below, the flight control system can be designed such that any and/or all axial and angular degrees of freedom of movement have redundant modes of operation with at least one secondary mode, thereby increasing vehicle maneuverability and survivability.

Figure 23:
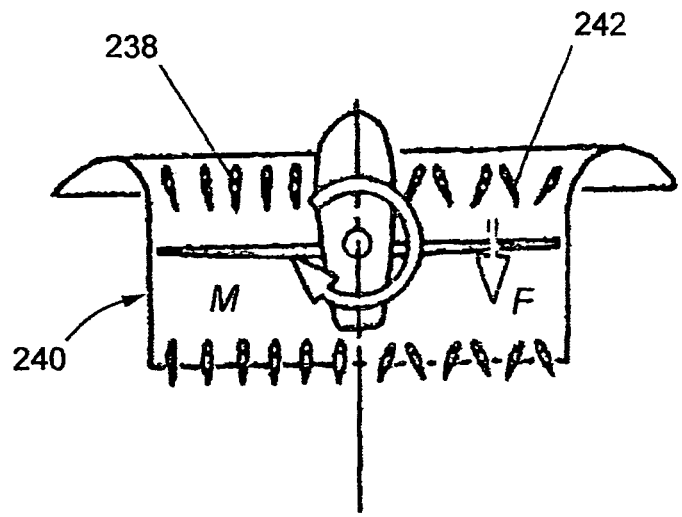
FIG. 23 illustrates air flow through a duct with upper and lower control vanes adjusted asymmetrically to restrict flow on one side of the duct.
Figure 24:
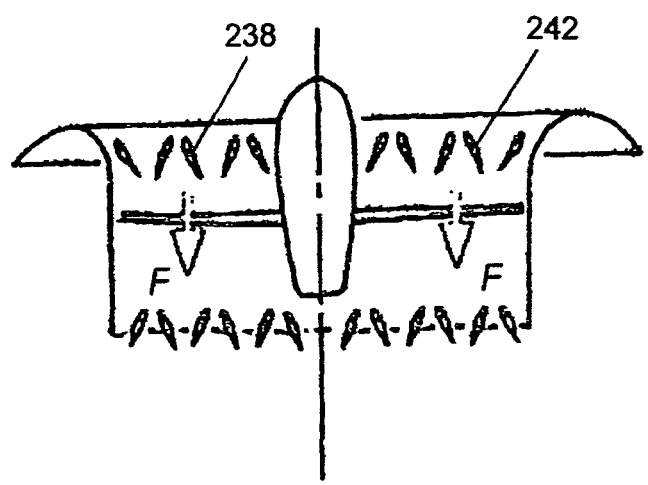
FIG. 24 illustrates air flow through a duct with upper and lower control vanes adjusted symmetrically to restrict flow uniformly through the duct.
Figure 25:
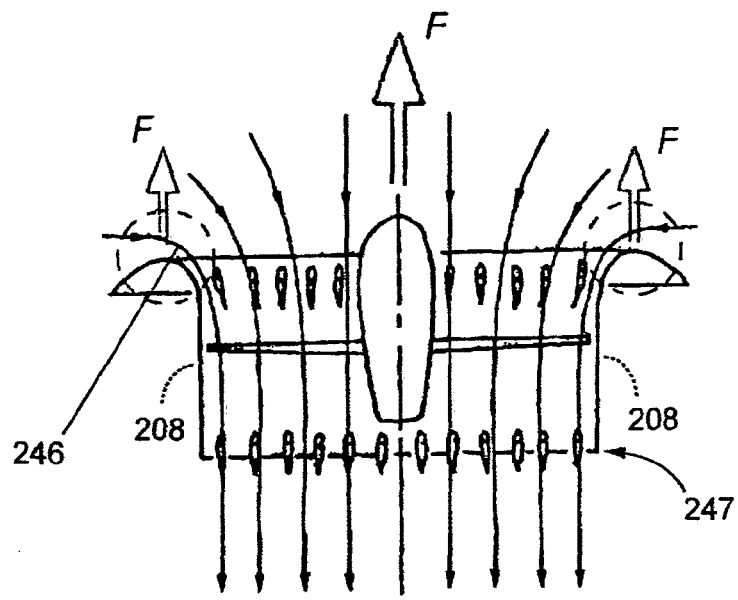
FIG. 25 illustrates air flow through a duct with side openings in the duct in a closed position.
Figure 26:
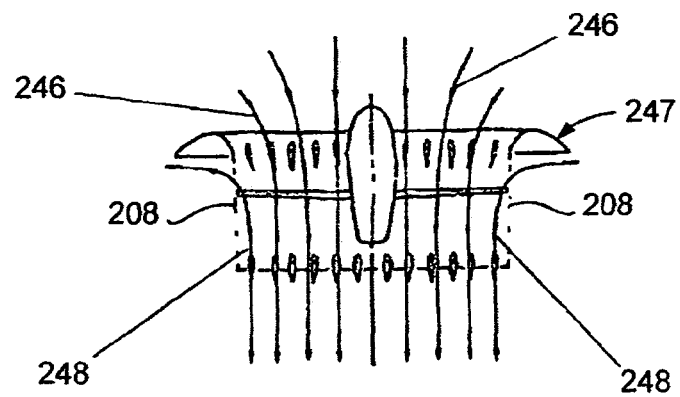
FIG. 26 illustrates air flow through a duct with side openings in the duct in an open position.
Figure 27:
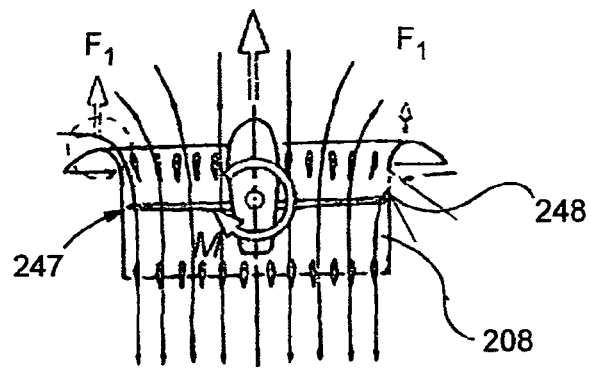
FIG. 27 illustrates air flow through a duct with one side opening in the open position and an opposite side opening in the closed position.

FIGS. 23-27 illustrate several examples of part of the features which were mentioned in FIGS. 17A-22B hereinabove namely various control possibilities which can be achieved by the control vanes and the openings in the side walls of the ducts enabling the redundancy of said primary and secondary modes. In FIG. 23, the control vanes 238 at the left side of the duct 240 are substantially aligned with the airflow streamlines flowing through the duct allowing substantially free unrestricted through airflow, whereas vanes 242 at the right side of the duct, are tilted so that they do not align with the airflow streamlines and partially block the flow, creating additional drag yielding force F on these vanes and thereby creating a roll moment M on the vehicle as was also explained in connection with FIGS. 20A and 20B hereinabove. It should be also noted that the detachment of airflows streamlines over the vanes and vortices which may be created can further reduce the efficiency of the propeller by disturbing the airflow inside the duct thus creating also desired lift imbalance on the propellers themselves thereby further affecting the moment M. In FIG. 24, the vanes 242 and 238 at both sides of the duct 240 are tilted similarly to produce disturbance of the airflow thus yielding substantial symmetric vertical forces F acting on the vanes thereby affecting the motion in the vertical axis degree of freedom. FIGS. 25 and 26 illustrate the effects of the openings 208 in the left and right side walls of the ducts 247 (i.e., on opposite sides of the longitudinal axis) when in various positions. In FIG. 25, the openings 208 are closed thereby the strong airflow 246 over the lips of the duct 247 creates low pressure area yielding upward forces F acting on the vehicle substantially symmetric whereas in FIG. 26, the openings 208 at the side wall of the duct 247 (such as those shown at 332, 334, 336 and 338 in FIGS. 37A and 37B) are open to allow airflow 248 through, thus reducing the airflow 246 over the ducts lips thereby reducing the suction hence the vertical upward forces on the duct lips. FIG. 27 illustrates an asymmetry in the duct 247 wherein the openings 208 allow through airflow 248 at one side of the duct being asymmetric to the other side thereby creating asymmetric upward forces F1 and F2 in which F1 at the substantially closed side opening of the duct greater than F2 at the other side and roll moment M over the axis of the vehicle.

It should be appreciated that in all of the preferred embodiments described hereinabove the control vanes of the ducts are tilted symmetrically or asymmetrically in groups or arrays (e.g., vanes on the left and right sides of the center axis in the forward and aft ducts, respectively, may be adjusted separately) to only affect the through-airflow and they are never fully closed to totally block the airflow, i.e., the blocking of the flow is always partial. It should also be noted that the airflow characteristics described herein are also influenced by local conditions evolving from the type of motion and direction or speed of the vehicle and its distance from flow influencing objects.

It should be further appreciated that the louvers described hereinabove in the front, rear or side openings of the duct walls can also be adjusted (e.g., via rotation) either together or individually in groups or in arrays to the degree desired. Both the control vanes and the louvers can also be combined with non pivotal means that are used to control flow. Such non pivotal means may employ aerodynamic means other than rotation to modify the pressure field around the vanes and around the vertical louvers for creating a force, such as air suction or blowing through orifices on the surface of the vanes and the vertical louvers or piezoelectric actuators or vibratory oscillators or other fluidic control means to induce steady or periodic pressure field changes to the flow around the vanes and vertical louvers, all with the purpose of producing desired control force or rotary moment control force.

Figure 28:
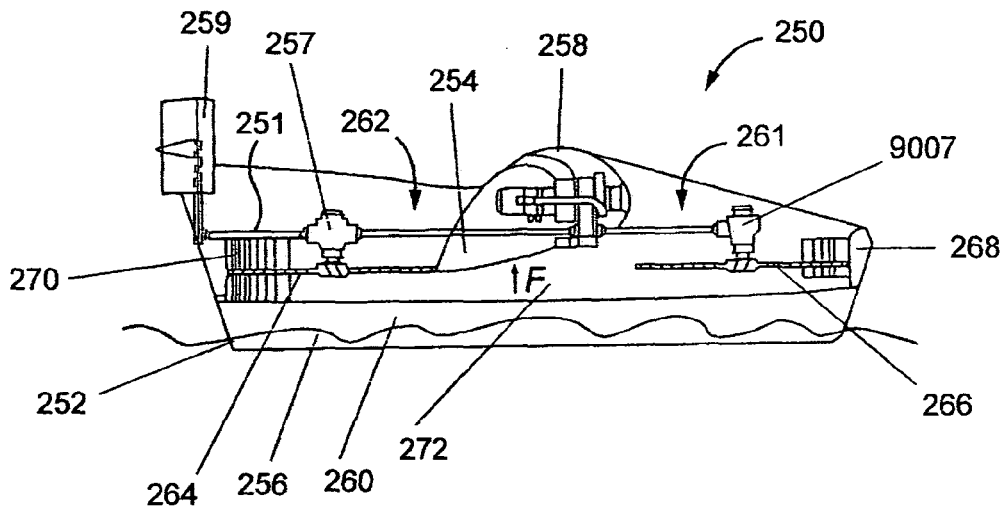
FIG. 28 is a side elevation of a ducted fan vehicle in accordance with another embodiment of the invention, with flow barriers attached on opposite sides of the vehicle.
Figure 29:
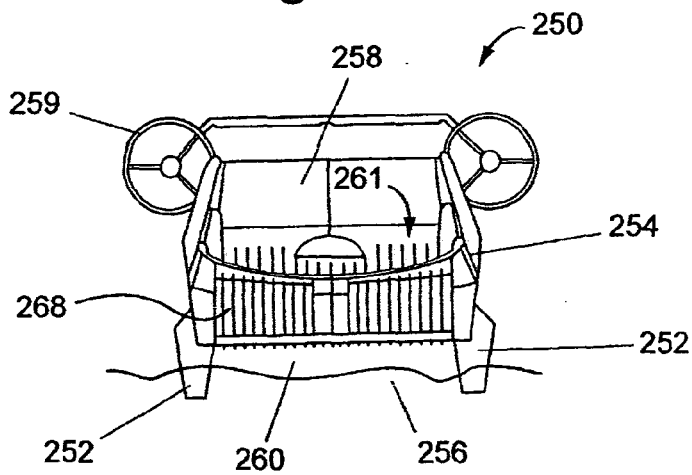
FIG. 29 is a front elevation of the vehicle shown in FIG. 28.
Figure 30:
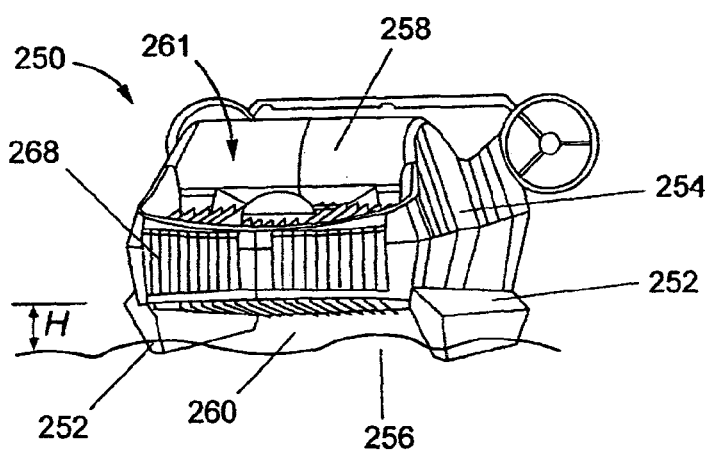
FIG. 30 is a front right perspective view of the vehicle shown in FIGS. 28 and 29.
Figure 31:
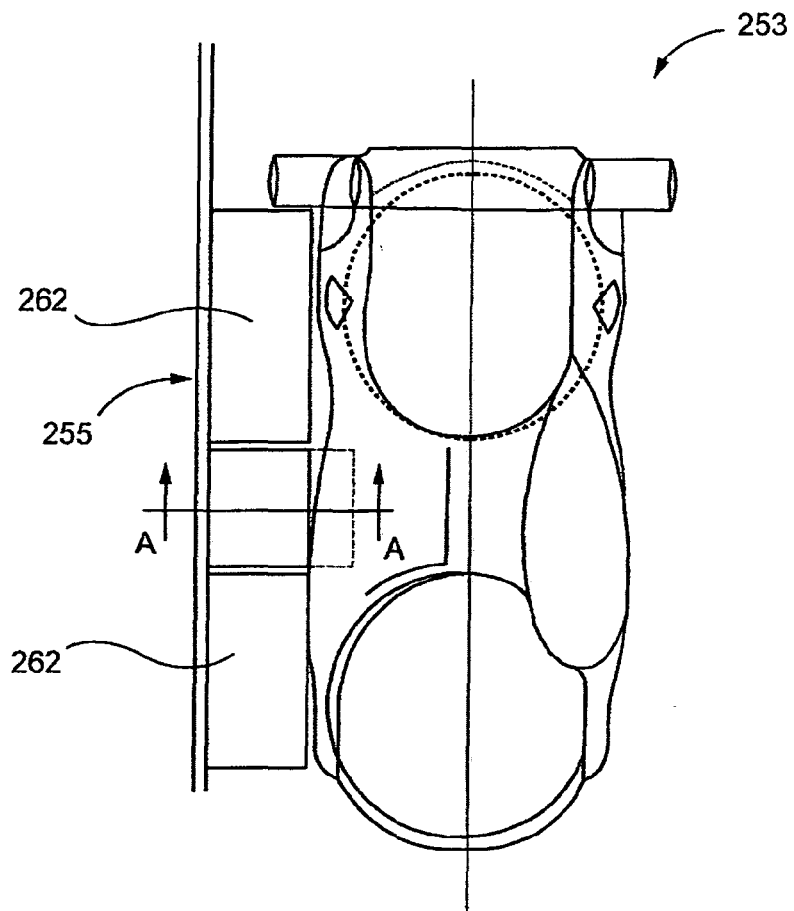
FIG. 31 is a schematic plan view showing a vehicle adjacent a building, with separators employed to maintain a desired clearance.
Figure 32:
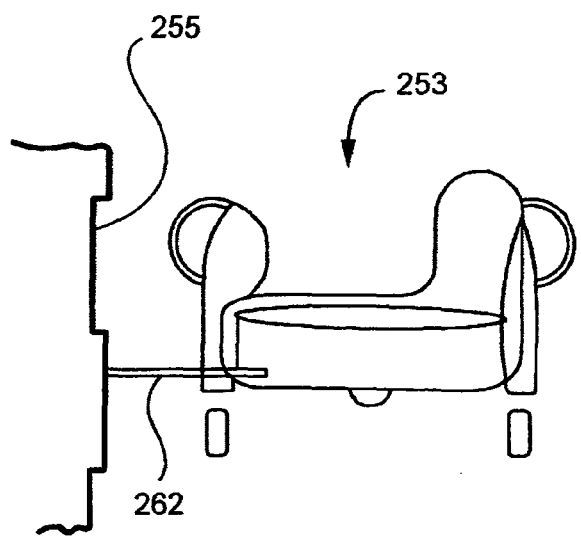
FIG. 32 is a front elevation of the vehicle shown in FIG. 31.

FIGS. 28-30 illustrate a ducted fan vehicle 250 having barriers 252 at the lower sides of fuselage 254 between the fuselage and the ground 256 which can be solid or liquid such as water or another surface over which the vehicle is flying which can enhance the wing in ground effect (WIG) created at the bottom of a vehicle when close to the ground which typically increases the lift. It should be appreciated that the central area 258 of the fuselage between the two ducts 261, 262 is preferably designed to be aerodynamically efficient as possible with shape close as feasible to a wing or an airfoil in order to enhance the forward flight speed and therefore when flying close to ground 256 or water, its lift is increased by the high pressure formed under the lower surface of the vehicle and central area 258 due to the contraction of local airflow in the area 260 contained between this lower surface and the ground over which the vehicle is flying thereby increasing the total lift force F acting on the vehicle. In this regard, the fuselage in the lower side wall areas is shaped to achieve suitable WIG effects. Nevertheless, it is possible to further enhance WIG effects by the addition of barriers 252 positioned at the bottom and to the sides of the vehicle to further enclose the area 260 between the bottom of the vehicle and the ground 256, and to further block the air from flowing sideward, thereby keeping the high pressure formed in area 260 from spilling outward. In another preferred embodiment of the present disclosure the barriers 252 also may act as floats to enable the vehicle to land in water. In other preferred embodiments of the present disclosure the barriers 252 may have various structures and shapes and also be used for additional or multifunction purposes for example to complement a hovercraft skirt to be added to the front and rear of the vehicle in order to create a fully enclosed hovercraft air cushion. Another preferred embodiment relates to using separators provided to maintain clearance between a vehicle 253 and an adjacent object, such as a building 255. An example of such separators is shown in FIGS. 31, and 32 at 262. These separators may also serve as barriers to enclose the area 260 by tilting the separators 262 downward to form a vertical wall, or to combine in one element various features such for example as a wall effect barrier, a hovercraft skirt, a landing gear and a load carrying compartment wherein its shape may be designed to be aerodynamically efficient as possible and considering also the design requirements to fit the contact with the ground if necessary.

Note also the drive arrangement in FIG. 28 wherein a drive rod or shaft 251 extends from the rear of the aft lift fan gearbox 257 and is operatively connected to the thruster 259 (which through a suitable drive may be connected to the thruster on the opposite side of the vehicle). Thus, the drive rod or shaft 251 is in the nature of a power take-off shaft that could be used to drive the rear thruster or other vehicle components.

It will further be appreciated that in the present disclosure the WIG effect can be achieved also with an incomplete bottom surface of the vehicle as would be recommended in general by using the propellers 264 and 266 to rotate such that by blowing of air they resist the flow of air from the area below the rotors and upward thereby sustaining the high pressure area 260 below the vehicle substantially as if sealing the bottom of the vehicle to create a substitute virtual bottom at the holes containing the propellers. By the same token, the flight forward when the front and aft openings 268 and 270 in the walls of the ducts are open to allow through airflow keeps air blowing from the outside towards the unenclosed duct gap 272 as was explained for gap 156 in FIG. 8 hereinabove substantially sealing the gap 272 and retaining the high pressure at area 260. It should be appreciated that such use of the rotors and other airflow to substantially complement the vehicle's bottom to create a WIG effect is also effective in other vehicles and ducted fan embodiments.

Figures 33, 34:
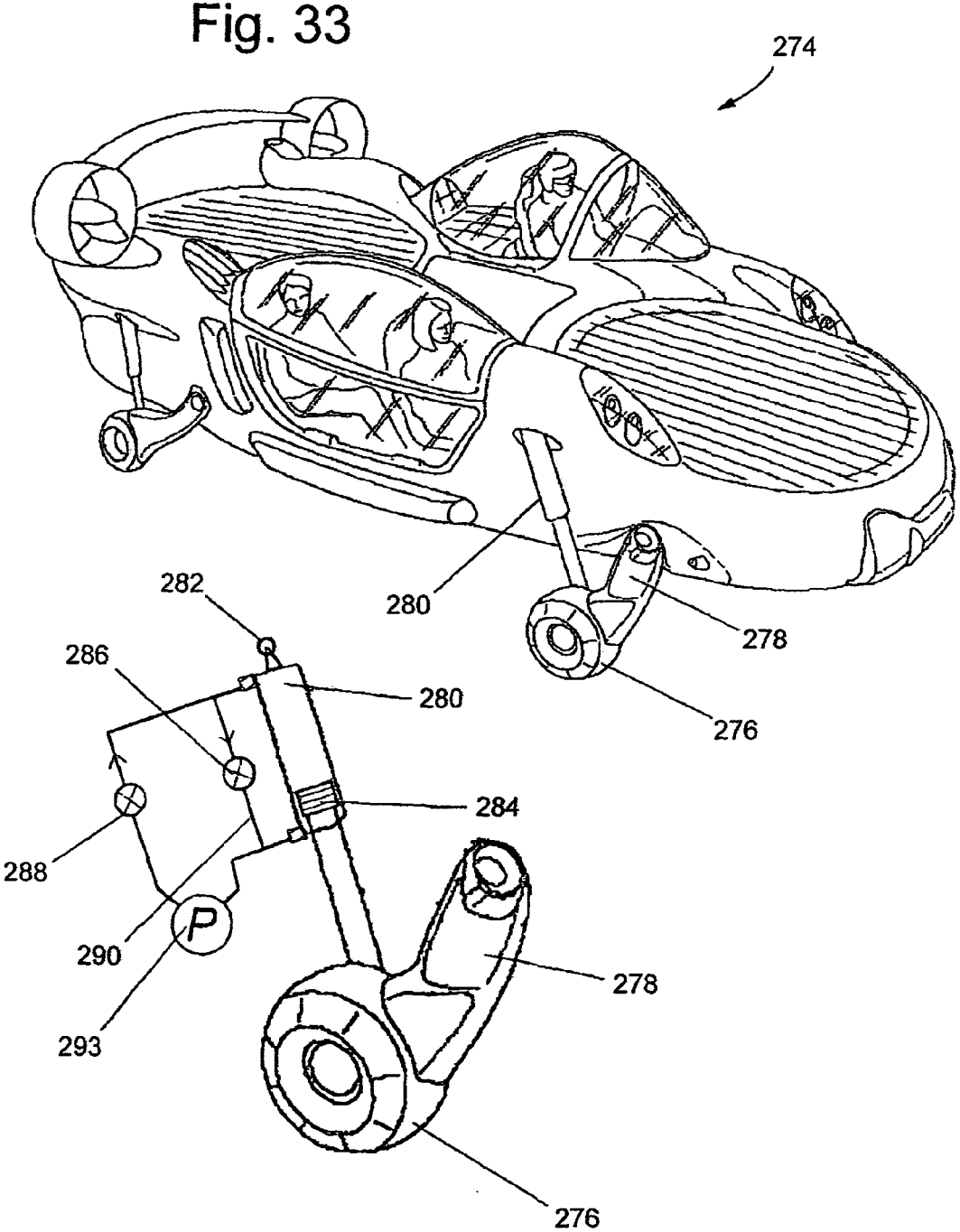
FIG. 33 is a perspective view of a ducted fan vehicle provided with shock-absorbing landing gear in accordance with an exemplary embodiment of the invention.
FIG. 34 is a detailed view of a part of the landing gear in FIG. 33, but also showing a hydraulic circuit therefore.

FIGS. 33 and 34 schematically illustrate a common landing gear of a vehicle 274 typically having at least two landing gears which can be wheels (or skids as shown, for example, at 192 in FIG. 11), or of other type whereas the wheel 276 is connected to a moving (i.e., pivotable) leg 278, and the shock absorbing unit includes a strut 280 which typically may be gas or liquid filled but can also be a mechanically or electrically activated unit or their combinations thereof which is connected to the body of the vehicle 274 through joint 282 and also connected to the leg 278. It has been observed that when flying vehicles land on either one or two wheels out of the rest of the wheels at relatively high rate of descent and the shock absorbers are activated then the vehicle will rotate around the point or line of first contact with the surface causing angular rates which can cause impact when the other wheels will touch down and thereby damage to vehicle or to people. This can be caused also when landing on uneven or unstable surfaces or at slopes such as sides of a hill. In one of the preferred embodiment of the present disclosure the piston 284 in the strut 280 typically either hydraulically or pneumatically operated is influenced by a means such for example as a valve 286 that can be activated to be open or close which will be in open position while valve 288 is kept in a closed position to allow the absorbing fluid to flow in tubes 290 from one side of the piston to the other in manner enabling the shock absorber to accommodate the translation of the piston but without generating substantial forces until most or all wheels of the vehicle touch the surface and then it will be activated to a closed position, reducing or stopping the fluid flow in tubes 290 thereby enabling shock absorbing resistance to develop in the strut 280, from which point in time all the wheels will begin to absorb the landing impact substantially evenly. As a safety measure, if the strut piston 284 reaches a predetermined distance of its stroke before the other landing gear wheels reach the surface, the valve 286 will be activated into a shut or closed position in order to develop absorption force thereby avoiding bottoming and damaging the structure which may be created by unabsorbed descent. In another preferred embodiment of the present disclosure upon touch down of the first landing gear the shock absorbing units of the other landing gears can be extended towards the surface ground for example by shutting valve 286 opening valve 288 and using pump 293 to cause the fluid to flow back into the strut cylinder thereby pushing the piston 284 toward the ground so that all landing gears will be activated substantially simultaneously but earlier than in the case explained hereinabove.

It should be also appreciated that the ability to control the distance from surface of the shock absorbing units as explained hereinabove can be also used to adjust or stabilize the vehicle at desired positions relative to the horizon while standing on tilted or moving surfaces, for example, to keep it substantially horizontal while standing on a sloped surface or keeping it stable at substantially fixed position while landing or standing on a moving ship deck. This can be achieved by an active control system able to synchronize between the positions and activations of the landing gears having control means typically a central processing unit (CPU) receiving signals from sensing devices related to the conditions and positions of the vehicle and the landing gear wheels relative to the surface and other desired inputs and commanding various actuators moving the landing gears as required. It should further be appreciated that the ability to actively control and maneuver the landing gears jointly and individually as explained hereinabove can be also useful to sustain the vehicle at dynamic stable position on the surface with its engines operating and to suppress the effect of ground resonance which basically is an out-of-balance condition in the vehicle on the ground (for example, the rotor system of a helicopter rapidly increases in frequency causing uncontrolled vibrations until the vehicle shakes hazardously which may damage or even destroy it).

Figure 35A:
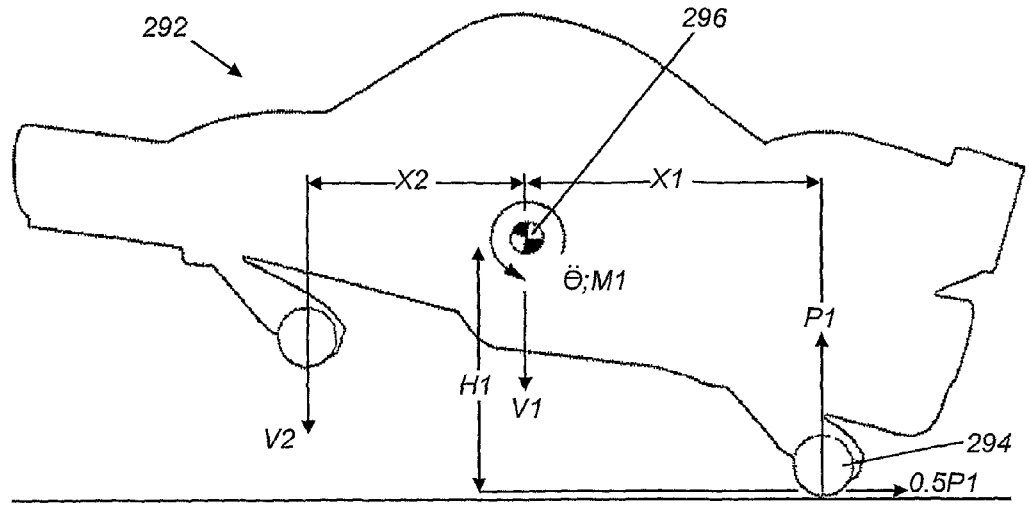
FIGS. 35A and 35B schematically illustrate the influence of landing forces on the vehicle.
Figure 35B:
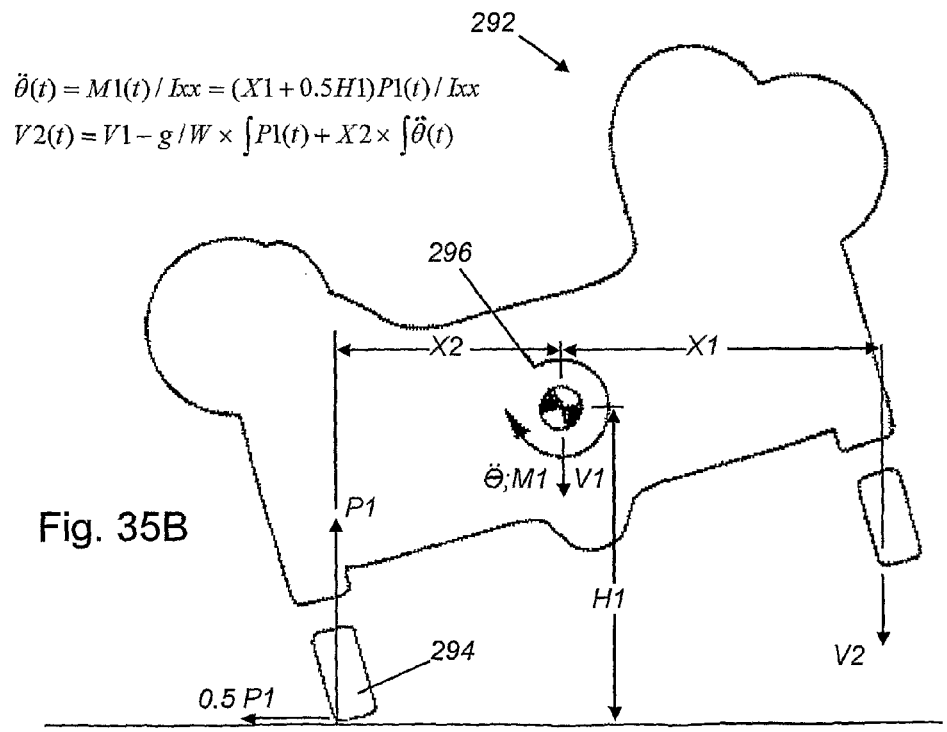

FIG. 35A is a schematic side view outline of a vehicle 292 with landing gear such as explained in FIG. 34 hereinabove, illustrating the landing of the vehicle at downward velocity V1 wherein the vehicle in this example is tilted such that the rear wheel 294 is first to touch the ground and force P1 acting on this wheel is developing substantially upward thereby creating a moment M1 at the vehicle center of gravity 296 causing a pitch angular acceleration which may yield the impact velocity V2 of the forward wheel to be substantially greater than V1 with potential damage to the vehicle or people when the forward wheel hits the ground. By using a mechanism such as illustrated in FIG. 34 hereinabove force P1 can be substantially prevented from developing hence V2 will not develop and all wheels will hit the ground at substantially same smaller velocity V1. Similarly, FIG. 35B illustrates a schematic front view outline of the vehicle wherein in this example the right rear wheel 294 is the first to touch the ground with force P1 developing creating moment M1 causing the left wheel to hit the ground at velocity V2 hence risking damage.

Figure 36:
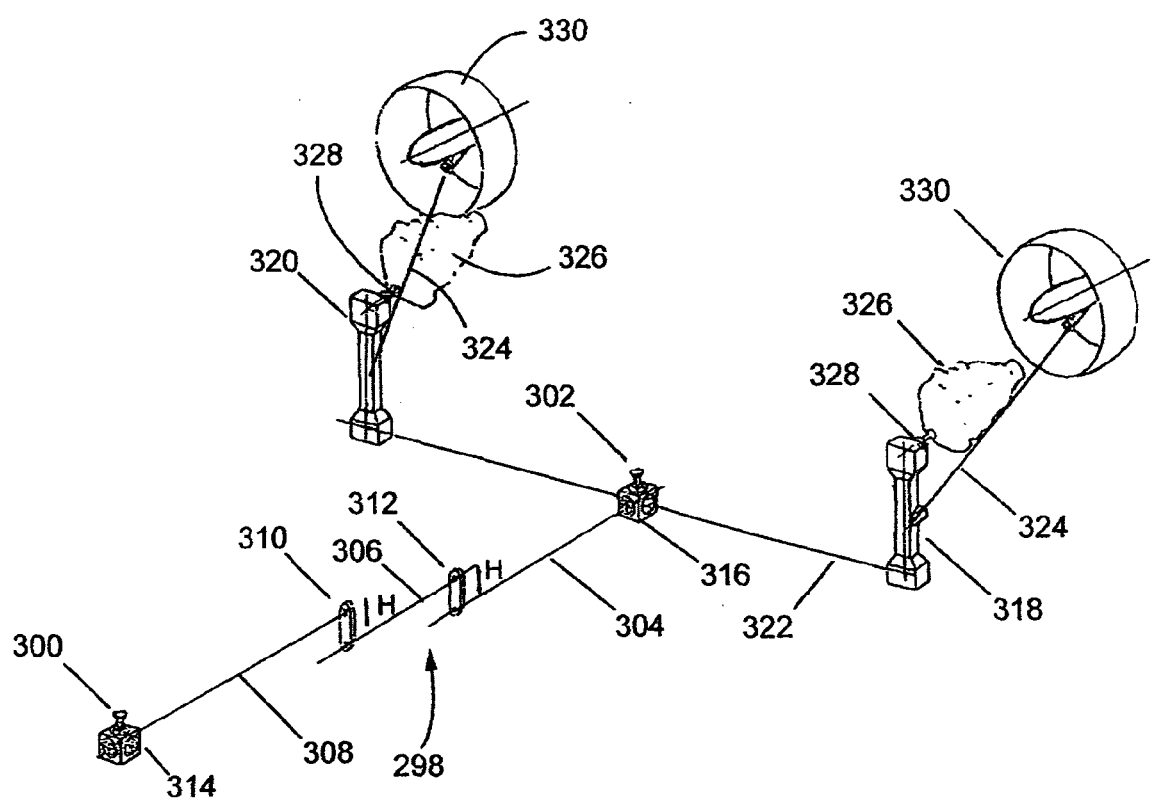
FIG. 36 is a schematic diagram of a transmission configuration for a ducted fan vehicle in accordance with an exemplary embodiment of the invention.

FIG. 36 illustrates a modified embodiment of the power distribution system for transmitting the power from each of the rear mounted engines to the two lifting fans and two pusher fans, wherein the shaft 298 interconnecting both main lift rotors 300, 302 is divided into three segments 304, 306 and 308, connected by two gearboxes 310 and 312 through flexible joints. This division into three shaft sections instead of two shafts yields shorter shafts in each section thereby increasing the torsional and vibrational stiffness of the system. Another advantage of splitting the required shaft length into more sections when the lift rotors 300, 302 of the vehicle and their corresponding gearboxes 314, 316 are not in the same plane is by creating additional vertical steps H when looked at from the side wherein the typical vertical step H of the three shafts system is lower than the one step in a two shaft system, thereby enabling the complete three shafts system between gearboxes 314, 316 to be shallower and positioned such that it protrudes less into the bottom of the vehicle and into its outer mode line (OML) which is advantageous to the utilization of spaces in the vehicle design. Other drive components shown in FIG. 36 include transmissions 318, 320; horizontal shaft 322; diagonal shafts 324; engines 326; shafts 328 and pusher fans or thrusters 330.

Figure 37A:
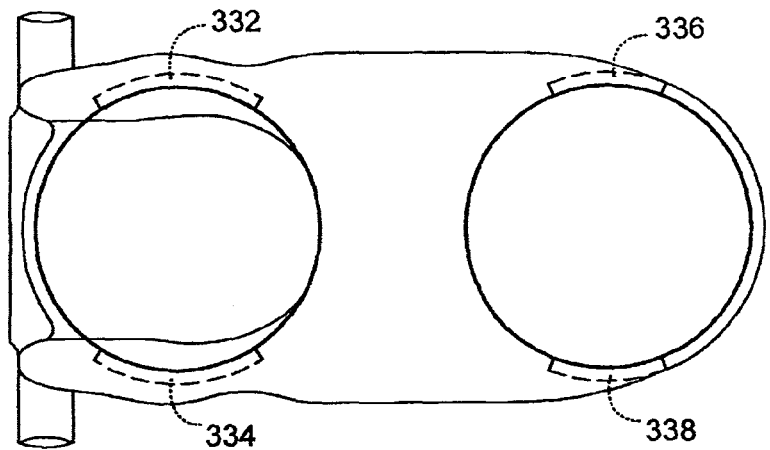
FIGS. 37A and 37B illustrate optional locations for additional adjustable duct openings on the left and right sides of the vehicle fuselage.
Figure 37B:
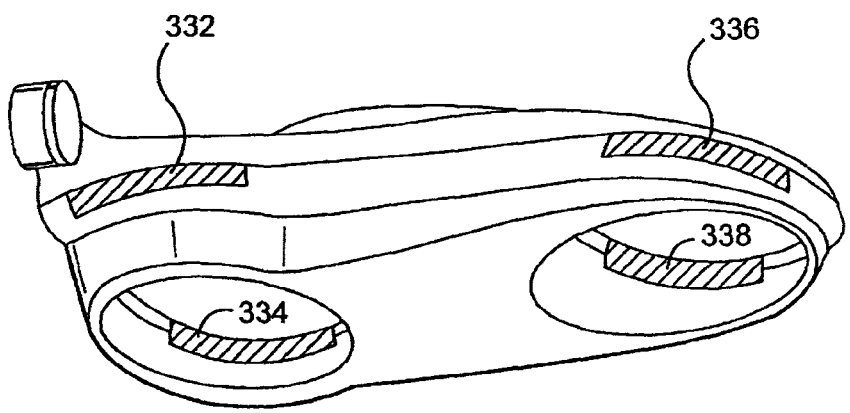
Figure 38:
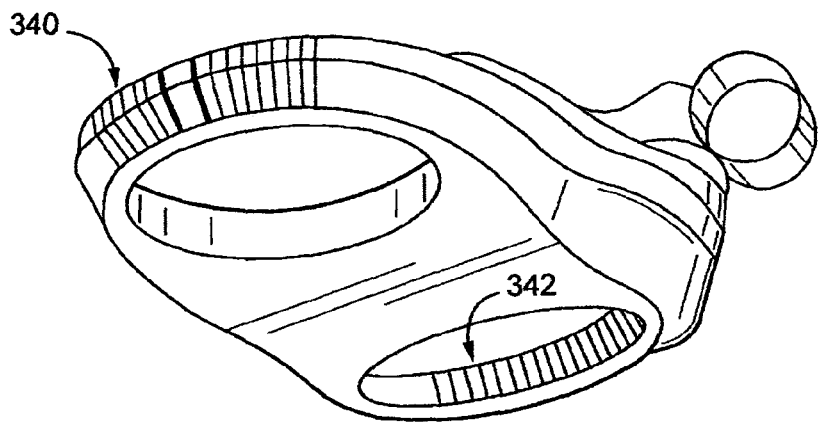
FIG. 38 shows a VTOL vehicle with forward and rearward adjustable duct openings.

FIGS. 37A and 37B merely illustrate an example of a ducted fan vehicle with selectively operated openings 332, 334, 336 and 338 at the side walls of the forward and aft ducts, preferably between the planes of upper and lower control vanes (not shown). Such openings can be advantageous for enhancement of vehicle control as described above, and also when the vehicle is facing side forces such as attraction forces to an adjacent object (such as a building), or when flying in gusty conditions and subject to substantial side forces. The potential benefit of these side openings is the reduction of the sensitivity of the ducted fan to side forces causing, for example, undesired lateral slides or rolling moments. FIG. 38B illustrates openings 340 and 342 in the front of the forward facing duct and in the rear of the aft duct, respectively, which can be of various size shapes, with suitable opening and closing features and mechanisms for adjusting the opening size. Again, the openings are beneficial in terms of vehicle control as described above. The openings in the ducts may retain their upper and/or lower structure like a frame or support to the openings their mechanisms, or may be without supporting frames. Of course, combining front and rear duct openings with side openings maximizes vehicle control possibilities and options with respect to movement in the six degrees of freedom.

While the invention has been described with respect to several preferred embodiments, it will be appreciated that these are set forth merely for purposes of example, and that many other variations, modifications and applications of the invention will be apparent.

What is claimed is:

1. A ducted air flow vehicle comprising:
   a fuselage having a longitudinal axis, supporting at least one forward duct and one aft duct, said ducts having respective lift producing propellers arranged to force surrounding air through said ducts thereby creating a lift force, said forward duct having side openings and a front opening, said aft duct having side openings and a rear opening, each of said openings selectively movable between open and closed positions;
   a plurality of adjustable control vanes extending across inlets to said ducts, in a direction substantially parallel to said longitudinal axis;
   a pair of thrusters supported in an aft location on said fuselage; and
   control means for:
   a. effecting motion in a first horizontal direction in a first degree of freedom of the vehicle in a primary mode of operation through varying of thrust output of said thrusters, and in a secondary mode of operation through tilting of the vehicle in pitch, thereby creating a horizontal and longitudinal vector component of said lift force in said first horizontal direction;
   b. effecting motion in a second horizontal direction substantially perpendicular to said first horizontal direction, in a second degree of freedom of the vehicle in a primary mode through deflecting said control vanes, and in a secondary mode of operation through tilting of the vehicle in Roll, thereby creating a horizontal and lateral vector component of said lift force in said second horizontal direction; and
   c. effecting motion in a vertical direction substantially perpendicular to said first and second horizontal directions in a third degree of freedom of the vehicle in a primary mode through direct variation of said lift force generated by said lift-producing propellers, and in a secondary mode through adjusting said control vanes, or adjusting said openings, thereby affecting flow of air through said ducts and the vertical lift force in said vertical direction.

2. The ducted air flow vehicle of claim 1, wherein said control means is also configured for:
   a. effecting yaw motion of the vehicle in a fourth degree of freedom in a primary mode of operation through adjustment of said control vanes, and in a secondary mode of operation through asymmetric operation of said thrusters;
   b. effecting roll motion of the vehicle in a fifth degree of freedom in a primary mode through symmetric adjustment of said control vanes in each of said fore and aft ducts, and in a secondary mode through asymmetric adjustment of said control vanes; or through moving said side openings on one side of said ducts to an open position; or by adjustment of side portions of said front and rear openings of said forward and aft ducts, respectively, differentially on one side of said front and rear openings relative to the other side of said front and rear openings;
   c. effecting pitch motion of the vehicle in a sixth degree of freedom in a primary mode through control of the lift-producing propellers and in a secondary mode through adjusting said control vanes differentially between said forward and aft ducts; opening or closing of said side openings uniformly in one of said forward and aft ducts; or through opening or closing of said front and rear openings in one of said forward and aft ducts.

3. A ducted air flow vehicle comprising:
   a fuselage having a longitudinal axis, supporting at least one forward duct and one aft duct, said ducts having respective lift producing propellers arranged to force surrounding air through said ducts thereby creating a lift force; said forward duct having side openings and a front opening, said aft duct having side openings and a rear opening, each of said openings selectively movable between open and closed positions;
   a plurality of adjustable control vanes extending across inlets to said ducts, in a direction substantially parallel to said longitudinal axis;

a pair of thrusters supported in an aft location on said fuselage; and control means for producing movement of the vehicle in each of six degrees of freedom by a first group of primary control elements, and alternatively, by a second group of secondary control elements.

4. The ducted air flow vehicle of claim 3 wherein said second group of secondary control elements comprises plural alternative means for producing movement in at least some of said six degrees of freedom.

5. The ducted air flow vehicle of claim 4 wherein said at least some of said six degrees of freedom include vertical movement, roll and pitch.

6. The ducted air flow of claim 5 wherein said alternative means for producing movement in a vertical direction in said secondary mode include means for effecting one or more of:
 a) tilting of said control vanes in said forward and aft ducts toward or away from each other; and/or
 b) adjustment of openings in said duct walls in a substantially uniform manner.

7. The ducted air flow vehicle of claim 5 wherein said alternative means for producing roll movement in said secondary mode include means for effecting one or more of:
 a) asymmetric change of control vane angles;
 b) adjustment of side openings in said ducts on one side of the vehicle asymmetrically with respect to side openings on the other side of the vehicle; and
 c) adjustment of louvers in front and rear openings of said forward and aft ducts differentially on one side of said front and rear openings relative to the other side of said front and rear openings.

8. The ducted air flow vehicle of claim 5 wherein said alternative means for producing pitch movement on said secondary mode include means for effecting one or more of:
 a) adjustment of said control vanes in one of said forward and aft ducts relative to the other;
 b) opening or closing of said side openings substantially uniformly in one of the forward and aft ducts; and
 c) opening or closing of said front or rear openings substantially uniformly in said forward and aft ducts.

9. The ducted flow vehicle of claim 3 wherein said control means selectively creates symmetric and asymmetric flows of air in one or both of said forward and aft ducts.

\* \* \* \* \*